(12) United States Patent
Yoshida

(10) Patent No.: US 11,659,037 B2
(45) Date of Patent: May 23, 2023

(54) CONTROL COMMUNICATION SYSTEM

(71) Applicant: Mitsubishi Electric Corporation, Tokyo (JP)

(72) Inventor: Mikiya Yoshida, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 129 days.

(21) Appl. No.: 16/990,066

(22) Filed: Aug. 11, 2020

(65) Prior Publication Data

US 2021/0136151 A1 May 6, 2021

(30) Foreign Application Priority Data

Oct. 30, 2019 (JP) .............................. JP2019-196931

(51) Int. Cl.
*H04L 29/08* (2006.01)
*H04L 67/12* (2022.01)
*H04L 67/00* (2022.01)
*G06F 8/65* (2018.01)

(52) U.S. Cl.
CPC ................ *H04L 67/12* (2013.01); *G06F 8/65* (2013.01); *H04L 67/34* (2013.01)

(58) Field of Classification Search
CPC ..... H04L 67/12; H04L 67/34; H04L 63/1425; G06F 8/65; G06F 11/0739; G06F 11/0751; G06F 11/0793; G06F 11/0796; G06F 11/203; G06F 11/2035; H04W 4/48; H04W 12/12
See application file for complete search history.

(56) References Cited

U.S. PATENT DOCUMENTS

| 2008/0044191 | A1* | 2/2008 | Akazawa ........... G03G 15/5087 399/45 |
| 2019/0340116 | A1* | 11/2019 | Miyauchi .............. G06F 11/203 |
| 2020/0150648 | A1 | 5/2020 | Horita et al. |

FOREIGN PATENT DOCUMENTS

| JP | 6189004 B1 | 8/2017 |
| JP | 2019-028506 A | 2/2019 |
| JP | 2019-089382 A | 6/2019 |

* cited by examiner

*Primary Examiner* — Kim T Nguyen
(74) *Attorney, Agent, or Firm* — Sughrue Mion, PLLC; Richard C. Turner

(57) ABSTRACT

There is provided a control communication system in which when an abnormality occurs in a function provided by a control apparatus, the function where the abnormality has occurred is relocated to another control apparatus so that the continuity of the function is suppressed from being deteriorated. In a control communication system, in the case where an abnormality related to a monitoring subject service is detected, there is selected a relocation control apparatus to which the foregoing monitoring subject service is relocated from a control apparatus where the foregoing monitoring subject service is currently disposed; a software element and execution and communication manifests for the foregoing monitoring subject service are transferred to a service storage device of the relocation control apparatus and are stored therein.

12 Claims, 16 Drawing Sheets

FIG. 9

| | IMAGE PREPROCESSING SERVICE | OBJECT DETECTION SERVICE | VEHICLE CONTROL SERVICE |
|---|---|---|---|
| EXECUTION MANIFEST | MACHINE STATE: UNDER EXECUTION<br>DEPENDENCE SERVICE: NONE<br>MAXIMUM CPU USAGE RATE : 40%<br>MAXIMUM MEMORY : 100MB<br>USAGE AMOUNT 311 | MACHINE STATE: UNDER EXECUTION<br>DEPENDENCE SERVICE: NONE<br>MAXIMUM CPU USAGE RATE : 20%<br>MAXIMUM MEMORY : 25MB<br>USAGE AMOUNT 321 | MACHINE STATE: UNDER EXECUTION<br>DEPENDENCE SERVICE: NONE<br>MAXIMUM CPU USAGE RATE : 25%<br>MAXIMUM MEMORY : 50MB<br>USAGE AMOUNT 331 |
| COMMUNICATION MANIFEST | IP ADDRESS : 192.168.1.2<br>SERVICE ID : 0x01 312 | IP ADDRESS : 192.168.1.2<br>SERVICE ID : 0x02 322 | IP ADDRESS : 192.168.1.3<br>SERVICE ID : 0x03 332 |

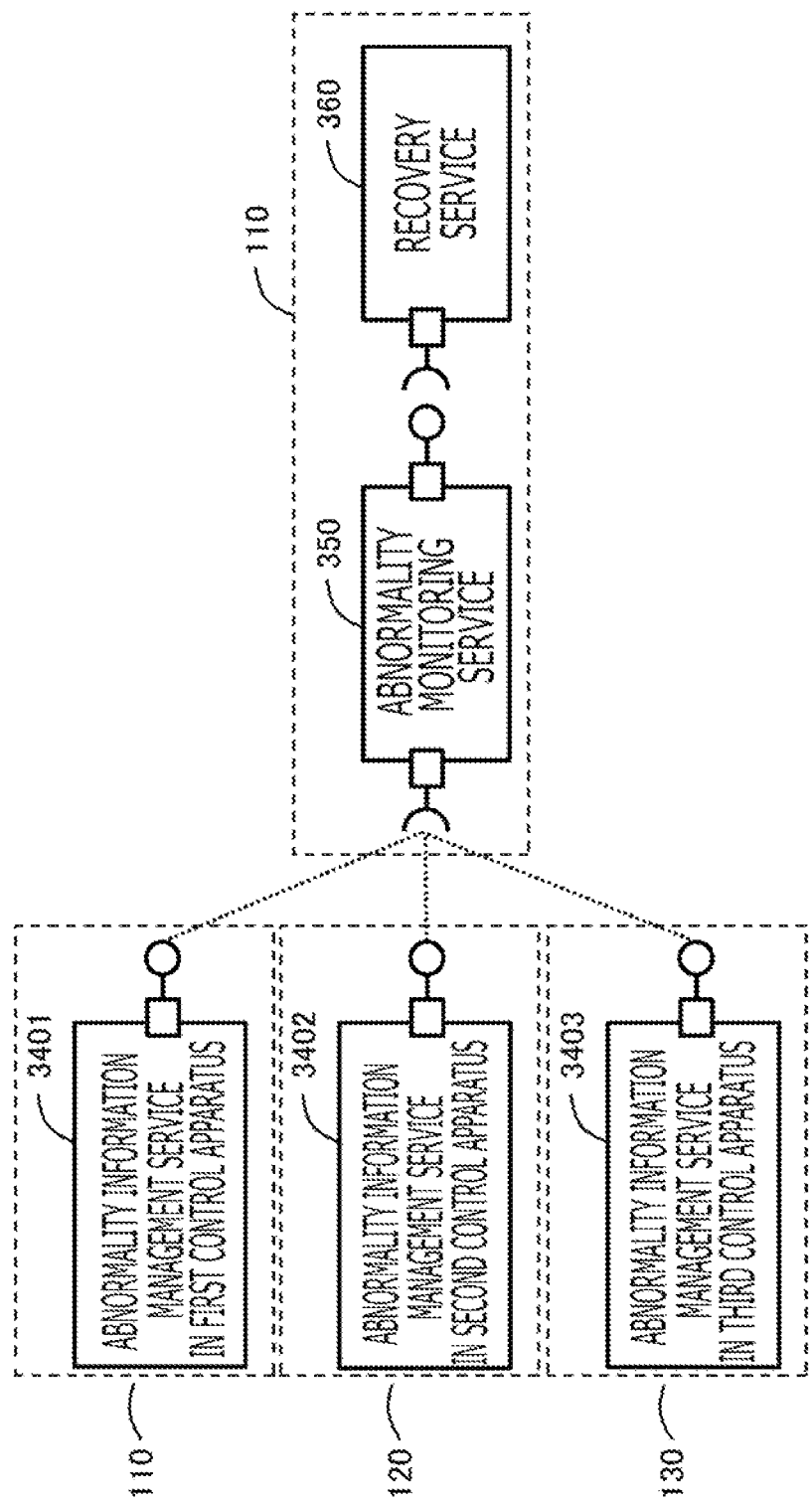

FIG. 11

| EXECUTION MANIFEST | ABNORMALITY INFORMATION MANAGEMENT SERVICE IN FIRST CONTROL APPARATUS | ABNORMALITY INFORMATION MANAGEMENT SERVICE IN SECOND CONTROL APPARATUS | ABNORMALITY INFORMATION MANAGEMENT SERVICE IN THIRD CONTROL APPARATUS |
|---|---|---|---|
| | MACHINE STATE: UNDER EXECUTION<br>DEPENDENCE SERVICE: NONE<br>MAXIMUM CPU USAGE RATE : 5%<br>MAXIMUM MEMORY : 10MB<br>USAGE AMOUNT<br>3411 | MACHINE STATE: UNDER EXECUTION<br>DEPENDENCE SERVICE: NONE<br>MAXIMUM CPU USAGE RATE : 5%<br>MAXIMUM MEMORY : 10MB<br>USAGE AMOUNT<br>3412 | MACHINE STATE: UNDER EXECUTION<br>DEPENDENCE SERVICE: NONE<br>MAXIMUM CPU USAGE RATE : 5%<br>MAXIMUM MEMORY : 10MB<br>USAGE AMOUNT<br>3413 |
| COMMUNICATION MANIFEST | IP ADDRESS : 192.168.1.1<br>SERVICE ID : 0x63<br>3421 | IP ADDRESS : 192.168.1.2<br>SERVICE ID : 0x63<br>3422 | IP ADDRESS : 192.168.1.3<br>SERVICE ID : 0x63<br>3423 |

| EXECUTION MANIFEST | ABNORMALITY MONITORING SERVICE | RECOVERY SERVICE |
|---|---|---|
| | MACHINE STATE: UNDER EXECUTION<br>DEPENDENCE SERVICE: NONE<br>MAXIMUM CPU USAGE RATE : 10%<br>MAXIMUM MEMORY : 10MB<br>USAGE AMOUNT<br>351 | MACHINE STATE: UNDER EXECUTION<br>DEPENDENCE SERVICE: ABNORMALITY MONITORING SERVICE<br>MAXIMUM CPU USAGE RATE : 10%<br>MAXIMUM MEMORY : 10MB<br>USAGE AMOUNT<br>361 |
| COMMUNICATION MANIFEST | IP ADDRESS : 192.168.1.1<br>SERVICE ID : 0x5A<br>352 | IP ADDRESS : 192.168.1.1<br>SERVICE ID : 0x5B<br>362 |

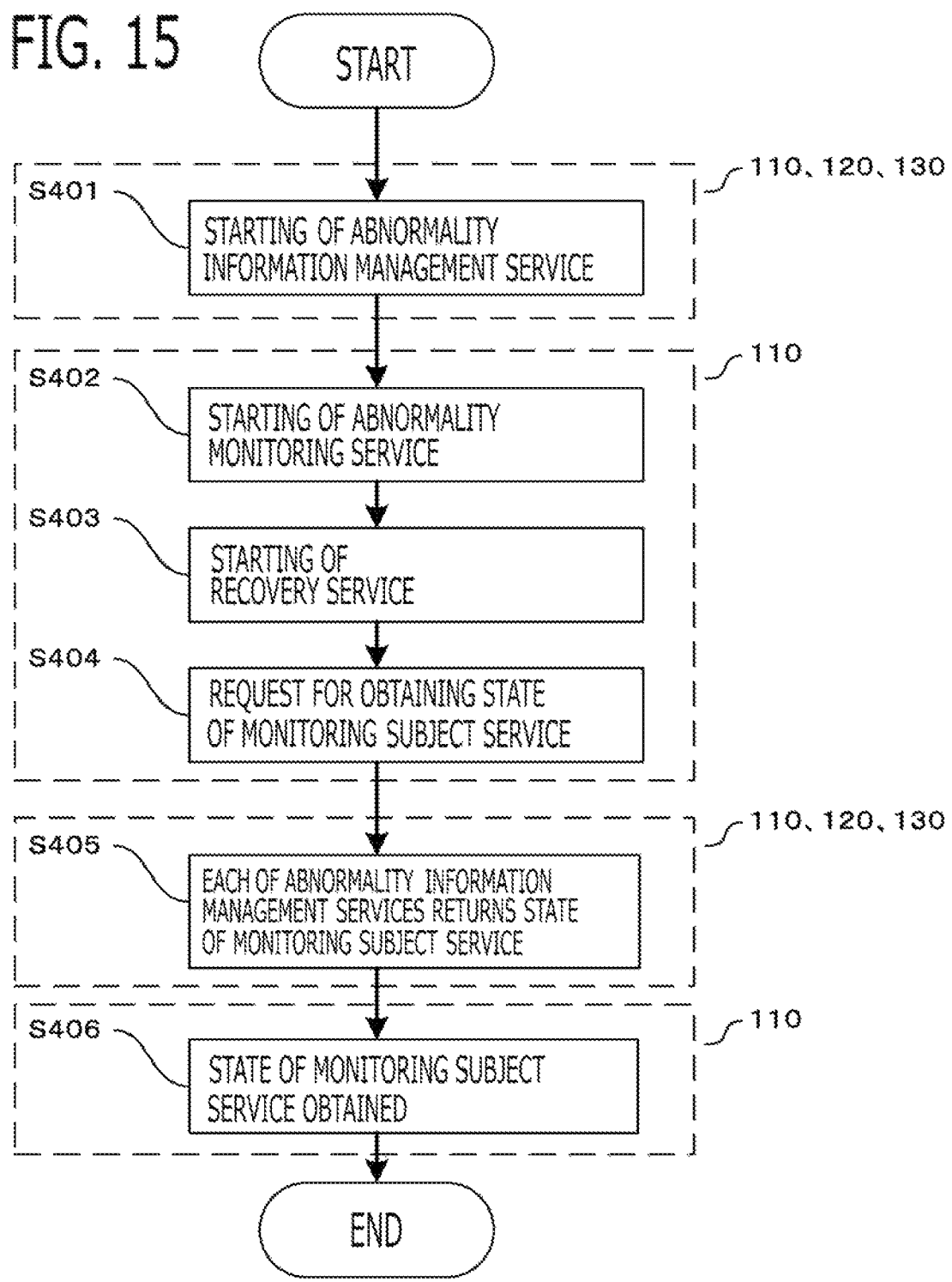

| MONITORING SUBJECT SERVICE | EXISTENCE OF ABNORMALITY | STATE OF COMMUNICATION | DISPOSED CONTROL APPARATUS |
|---|---|---|---|
| 0x01 (IMAGE PREPROCESSING SERVICE) | NO | SERVICE BEING PROVIDED | 192.168.1.2 |
| 0x02 (OBJECT DETECTION SERVICE) | NO | SERVICE BEING PROVIDED SERVICE BEING UTILIZED | 192.168.1.2 |
| 0x03 (VEHICLE CONTROL SERVICE) | NO | SERVICE BEING PROVIDED | 192.168.1.3 |

400b

| MONITORING SUBJECT SERVICE | EXISTENCE OF ABNORMALITY | STATE OF COMMUNICATION | DISPOSED CONTROL APPARATUS |
|---|---|---|---|
| 0x01 (IMAGE PREPROCESSING SERVICE) | NO | SERVICE BEING PROVIDED | 192.168.1.2 |
| 0x02 (OBJECT DETECTION SERVICE) | YES | SERVICE BEING PROVIDED SERVICE BEING UTILIZED | 192.168.1.2 |
| 0x03 (VEHICLE CONTROL SERVICE) | NO | SERVICE BEING PROVIDED | 192.168.1.3 |

400c

| MONITORING SUBJECT SERVICE | EXISTENCE OF ABNORMALITY | STATE OF COMMUNICATION | DISPOSED CONTROL APPARATUS |
|---|---|---|---|
| 0x01 (IMAGE PREPROCESSING SERVICE) | NO | SERVICE BEING PROVIDED | 192.168.1.2 |
| 0x02 (OBJECT DETECTION SERVICE) | NO | SERVICE BEING PROVIDED SERVICE BEING UTILIZED | 192.168.1.3 |
| 0x03 (VEHICLE CONTROL SERVICE) | NO | SERVICE BEING PROVIDED | 192.168.1.3 |

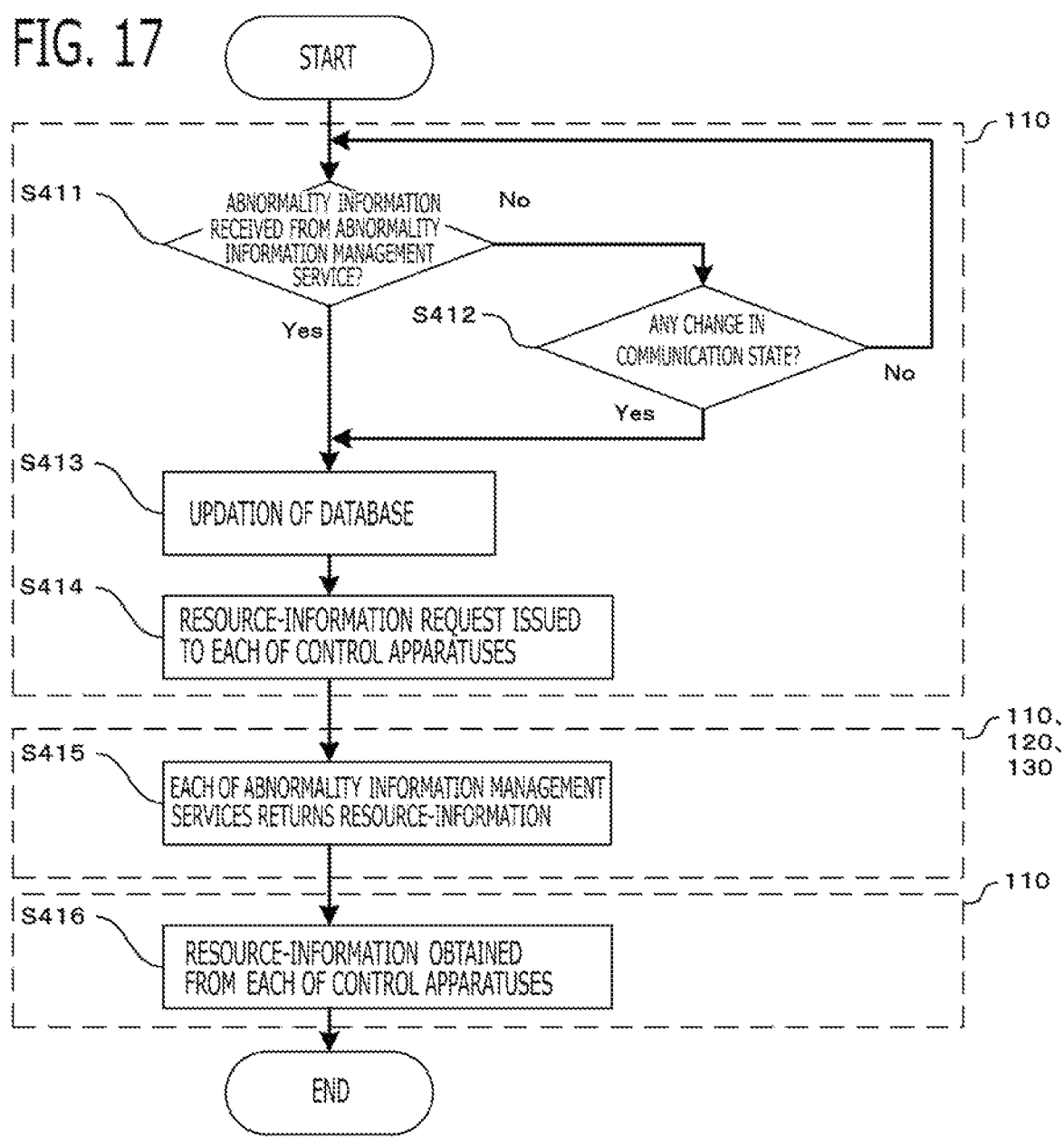

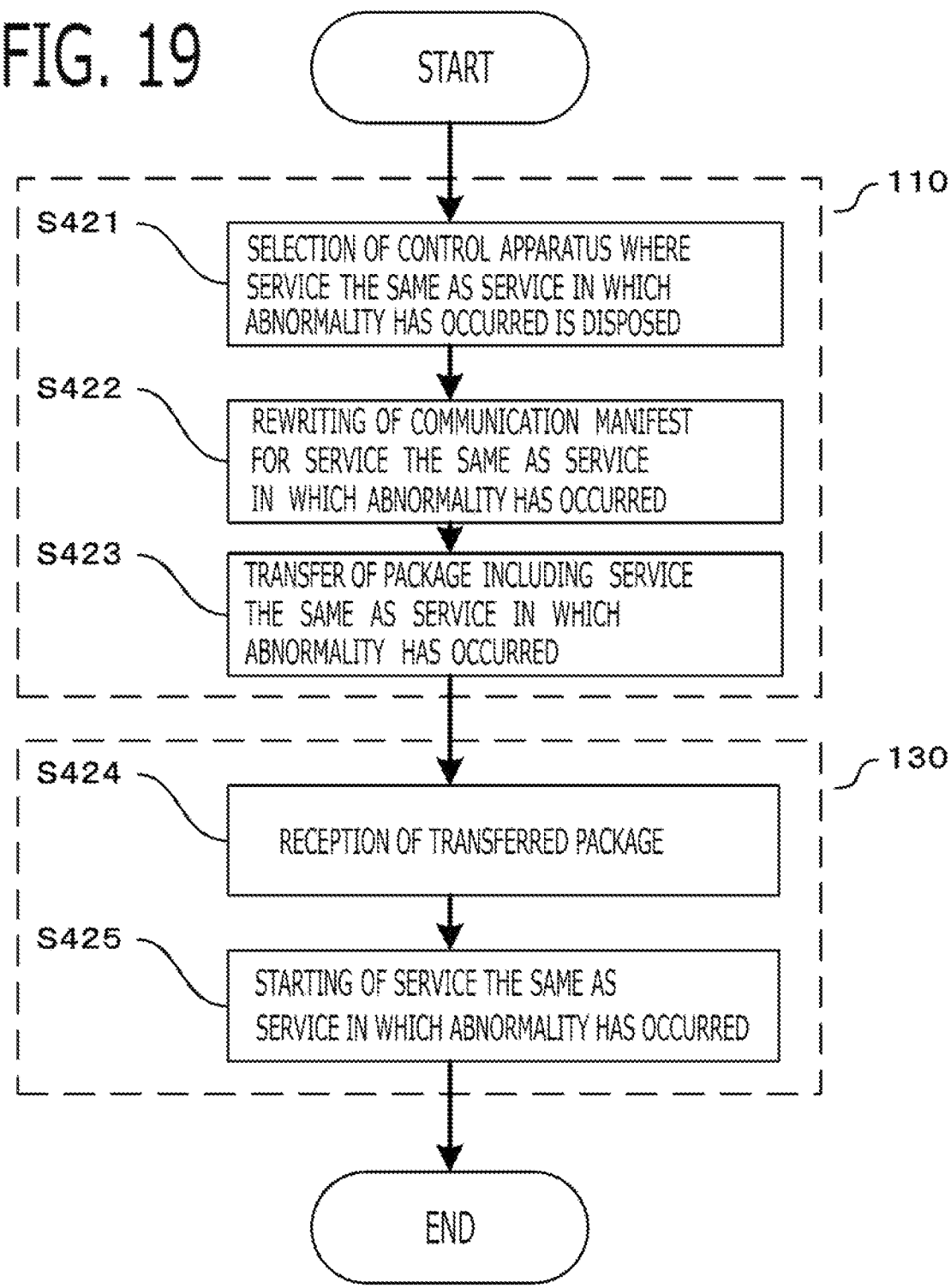

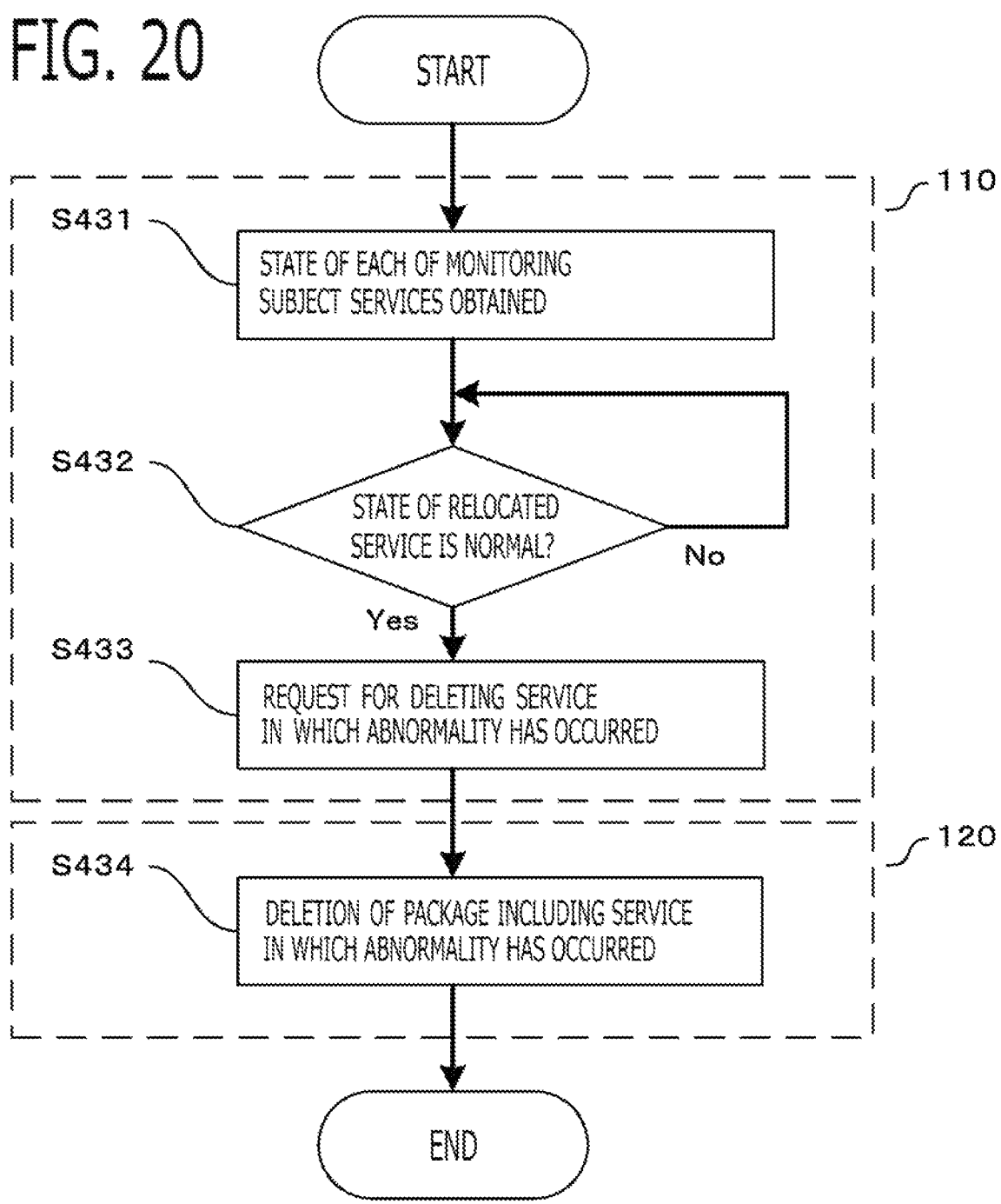

CONTROL COMMUNICATION SYSTEM

INCORPORATION BY REFERENCE

The disclosure of Japanese Patent Application No. 2019-196931 filed on Oct. 30, 2019 including its specification, claims and drawings, is incorporated herein by reference in its entirety.

BACKGROUND

The present disclosure relates to a control communication system.

In recent years, a system, such as an automobile, in which two or more control apparatuses are connected with one another through a network so that communication is performed, has become a complicated system in order to realize high-level control. As an example of the complicated system, there exists a drive assistance system for a vehicle, i.e., an automatic driving system. High-level safety is required for such a system; thus, it is required that even when part of functions thereof fails, control of the automobile is not disabled, the automobile is safely stopped, and the automobile travels to a safe place.

JP 6189004 B proposes a method in which in addition to two or more control apparatuses, a control apparatus is provided, and in which when any one of the two or more control apparatuses fails, the control apparatus, which has additionally been provided, executes a program that is to be executed by the failed control apparatus.

In JP 2019-28506 A, in the case where in a system including two or more control apparatuses, a normal control apparatus detects that there exists a failed control apparatus, the normal control apparatus determines the failed control apparatus by use of stored setting information. After the determination of the failed control apparatus, the setting information to be stored in the normal control apparatus is changed so that inputting/outputting of data and calculation, which are to be performed by the failed control apparatus, are performed by the normal control apparatus. The change in the setting information makes it possible that the normal control apparatus performs not only inputting/outputting of data and calculation, which are to be performed by the normal control apparatus, but also inputting/outputting of data and calculation, which have been performed by the failed control apparatus; thus, the control system can be maintained.

JP 2019-89382 A proposes a method in which in the case where in an automatic driving control system including two control apparatuses, one of the control apparatuses fails, the other one thereof executes a program that has been being executed by the failed control apparatus. Specifically, at first, each of the control apparatuses stores an automatic-driving program to be executed by another control apparatus; then, in the case where another control apparatus fails, each of the control apparatuses deletes programs being executed therein and having no relation with automatic driving and then loads and executes the automatic-driving program for another control apparatus that has been stored. As a result, even when a control apparatus fails, the continuity of the automatic driving function is suppressed from being deteriorated.

SUMMARY

In the system disclosed in JP 6189004 B, because it is required that in addition to the two or more control apparatuses, a backup-dedicated control apparatus is provided, the cost and the complexity of the system may increase. In the system disclosed in JP 2019-28506 A, just in case any one of the control apparatuses fails, it is required to consider that each of the control apparatuses prepares setting information, determines the failure, and then replaces the failed control apparatus for the processing to be performed by the failed control apparatus; therefore, the complexity of the system may increase, for example, when any one of the control apparatuses is modified, the modification involves many things and portions.

Also in the system disclosed in JP 2019-89382 A, it is required that as is the case with JP 2019-28506 A, just in case any one of the control apparatuses fails, each of the control apparatuses can replace another control apparatus; thus, the complexity of the system may increase.

Accordingly, the objective of the present disclosure is to provide a control communication system in which when an abnormality occurs in a function to be provided by a control apparatus, the function in which the abnormality has occurred is relocated to another control apparatus, without providing any backup-dedicated standby control apparatus and without making each of control apparatuses have a function of managing a backup, so that the continuity of the function is suppressed from being deteriorated.

A control communication system according to the present disclosure includes two or more control apparatuses each of which can separately execute two or more software elements for realizing respective services that are separate functions and a network for interconnecting the two or more control apparatuses; for each of the two or more services, there are provided an execution manifest including data on starting conditions for the service and a communication manifest including data on an identifier of the control apparatus in which said service is disposed and an identifier of said service; each of the two or more control apparatuses has a service storage unit that stores a software element for the service disposed in the control apparatus and the execution and communication manifests for said service, a service execution management unit that starts the service when the starting conditions included in the execution manifest for said service, stored in the service storage unit, are satisfied, an inter-service communication unit that communicates with the other services by use of the communication manifest for the service, stored in the service storage unit, and a software update management unit that applies updation, addition, and deletion to the software element and the execution and communication manifests for the service in the service storage unit; each of specific control apparatuses, which are preliminarily set and the number of which is the same as or larger than one but less than the number of all of the control apparatuses, further comprises an abnormality monitoring unit that detects whether or not there exists an abnormality related to a monitoring subject service, which is the service that is preliminarily set, and a recovery unit that selects a relocation control apparatus that is another control apparatus among the control apparatuses, to which the monitoring subject service in which an abnormality related to said monitoring subject service has been detected is relocated from the control apparatus where said monitoring subject service is currently disposed, in the case where the abnormality monitoring unit detects the abnormality, and that transfers, through the software update management unit, the software element and the execution and communication manifests for the monitoring subject service in which the abnormality has been detected to the service storage unit of the relocation control apparatus and then makes said service storage unit store said software element and said execution and communication manifests.

In a control communication system according to the present disclosure, each of control apparatuses that can execute services has a service storage unit, a service execution management unit, and an inter-service communication unit; each of specific control apparatuses, the number of which is the same as or larger than one but less than the number of all of the control apparatuses, has an abnormality monitoring unit and a recovery unit that perform recovery processing of a monitoring subject service in addition to the service storage unit, the service execution management unit, and the inter-service communication unit. Accordingly, without providing any backup-dedicated standby control apparatus and without making each of control apparatuses have a function of managing a backup, it is made possible that when an abnormality occurs in a preliminarily set monitoring subject service, the foregoing monitoring subject service in which the abnormality has occurred is relocated to another control apparatus so that the continuity of the monitoring subject service is suppressed from being deteriorated. Moreover, because each of the control apparatuses has an inter-service communication unit for communicating with other services by use of a communication manifest including data on the identifier of the control apparatus and the identifier of a service, it is readily performed that two or more services are arranged in a distributional manner in two or more control apparatuses and inter-service communication is performed; thus, even when the monitoring subject service in which an abnormality has been detected is relocated to another control apparatus, the inter-service communication can be maintained, so that the monitoring subject service can be continued.

BRIEF DESCRIPTION OF THE DRAWINGS

FIG. 9 is a figure for explaining respective execution manifests and respective communication manifests for the monitoring subject services according to Embodiment 1 of the present disclosure;
FIG. 10 is a diagram representing the relationship among monitoring-side services according to Embodiment 1 of the present disclosure;
FIG. 11 is a figure for explaining respective execution manifests and respective communication manifests for the monitoring-side services according to Embodiment 1 of the present disclosure;
FIG. 15 is a flowchart for explaining processing related to an abnormality monitoring service according to Embodiment 1 of the present disclosure;
FIG. 16 is a figure for explaining a database created by the abnormality monitoring service according to Embodiment 1 of the present disclosure;
FIG. 17 is a flowchart for explaining processing related to the abnormality monitoring service according to Embodiment 1 of the present disclosure;
FIG. 18 is a figure for explaining a list for resource usage states of each of control apparatuses, created by the abnormality monitoring service according to Embodiment 1 of the present disclosure;
FIG. 19 is a flowchart for explaining processing related to a recovery service according to Embodiment 1 of the present disclosure;
FIG. 20 is a flowchart for explaining processing related to the recovery service according to Embodiment 1 of the present disclosure.

DETAILED DESCRIPTION OF THE EMBODIMENTS

Embodiment 1

Figure 1:
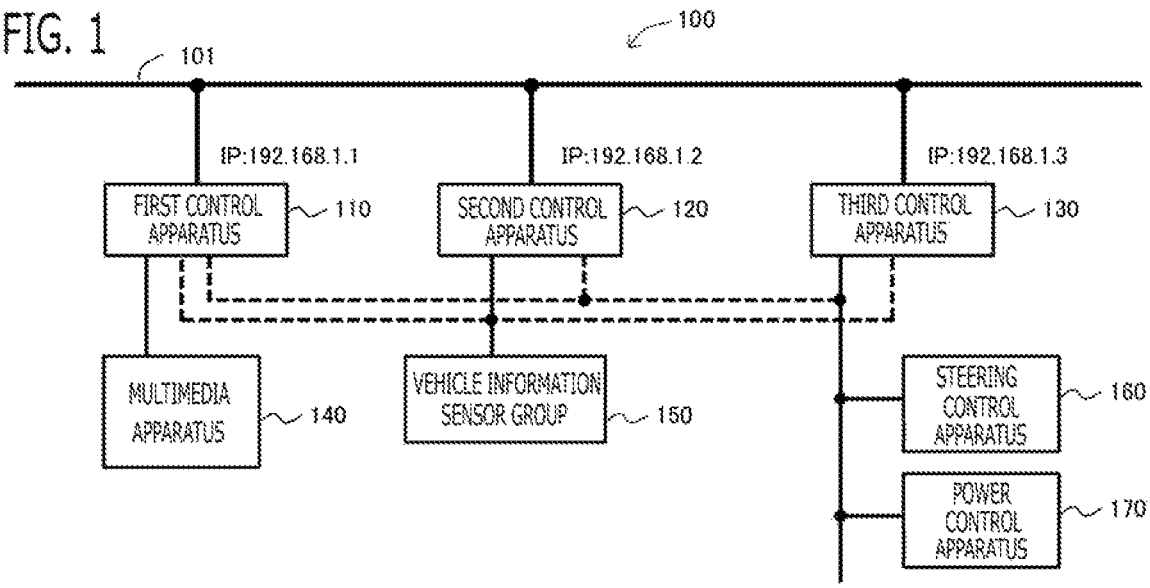
FIG. 1 is a schematic overall configuration diagram of a control communication system according to Embodiment 1 of the present disclosure.

A control communication system 100 according to Embodiment 1 will be explained with reference to the drawings. In the present embodiment, as an example, there will be explained a control communication system in which two or more control apparatuses mounted in an automobile are connected with one another through an on-vehicle network. FIG. 1 is a schematic overall configuration diagram of a control communication system according to the present embodiment.

In the control communication system 100, a first control apparatus 110, a second control apparatus 120, and a third control apparatus 130 are connected with one another through an on-vehicle network utilizing a communication bus 101. The on-vehicle network performs communication by use of a telecommunication standard such as Ethernet (registered trademark) or CAN (Control Area Network: registered trademark); hereinafter, as an example, the case where Ethernet is utilized will be explained.

The first control apparatus 110 is connected with a multimedia apparatus 140. In addition, the IP address of the first control apparatus 110 is set to 192.168.1.1. The multimedia apparatus 140 is an apparatus for realizing a multimedia function; for example, the multimedia apparatus 140 is an audio apparatus, an image display device, a human interface device, or the like. An IP address corresponds to a "control-apparatus identifier" in the present disclosure.

The second control apparatus 120 is connected with a vehicle information sensor group 150, and the output signal of the vehicle information sensor group 150 is inputted to the second control apparatus 120. The IP address of the second control apparatus 120 is set to 192.168.1.2. The vehicle information sensor group 150 includes various kinds of vehicle-control sensors, for example, a vehicle speed sensor, an acceleration sensor, a yaw rate sensor, a steering angle sensor, a periphery monitoring camera, a periphery monitoring radar (such as a millimeter wave radar, a laser radar, or an ultrasound radar), a position sensor, and the like. The position sensor is an apparatus that can obtain positional information by means of GNSS (Global Navigation Satellite System).

The third control apparatus 130 is connected with a steering control apparatus 160 and a power control apparatus 170. In addition, the IP address of the third control apparatus 130 is set to 192.168.1.3. The steering control apparatus 160 controls a driving motor and the like of an electric power steering device so that the steering angle of a wheel keeps track of a steering-angle target value determined based on a detection signal of the vehicle information sensor group 150. The power control apparatus 170 controls the output torque of a power machine such as a motor or an internal combustion engine so that the vehicle speed keeps track of a vehicle-speed target value determined based on a detection signal of the vehicle information sensor group 150.

The vehicle information sensor group 150 includes a sensor (a camera, in this example) related to a monitoring subject service (an image preprocessing service 310, in this example); therefore, just in case the image preprocessing service 310 is relocated from the second control apparatus 120 to the first control apparatus 110 or to the third control apparatus 130, the sensor (camera) of the vehicle information sensor group 150, which is related to the relocation, is redundantly connected also with the first control apparatus 110 and with the third control apparatus 130 (indicated by a broken line in FIG. 1). In addition, the steering control apparatus 160 and the power control apparatus 170 are related to the monitoring subject service (a vehicle control service 330, in this example); therefore, just in case the vehicle control service 330 is relocated from the third control apparatus 130 to the first control apparatus 110 or to the second control apparatus 120, the steering control apparatus 160 and the power control apparatus 170 are redundantly connected also with the first control apparatus 110 and with the second control apparatus 120 (indicated by a broken line in FIG. 1).

Alternatively, the vehicle information sensor group 150, the steering control apparatus 160, and the power control apparatus 170 related to the relocation of the monitoring subject service may be connected with the on-vehicle network in such a way that the relocation can be coped with.

<The First Control Apparatus 110>

Figure 2:
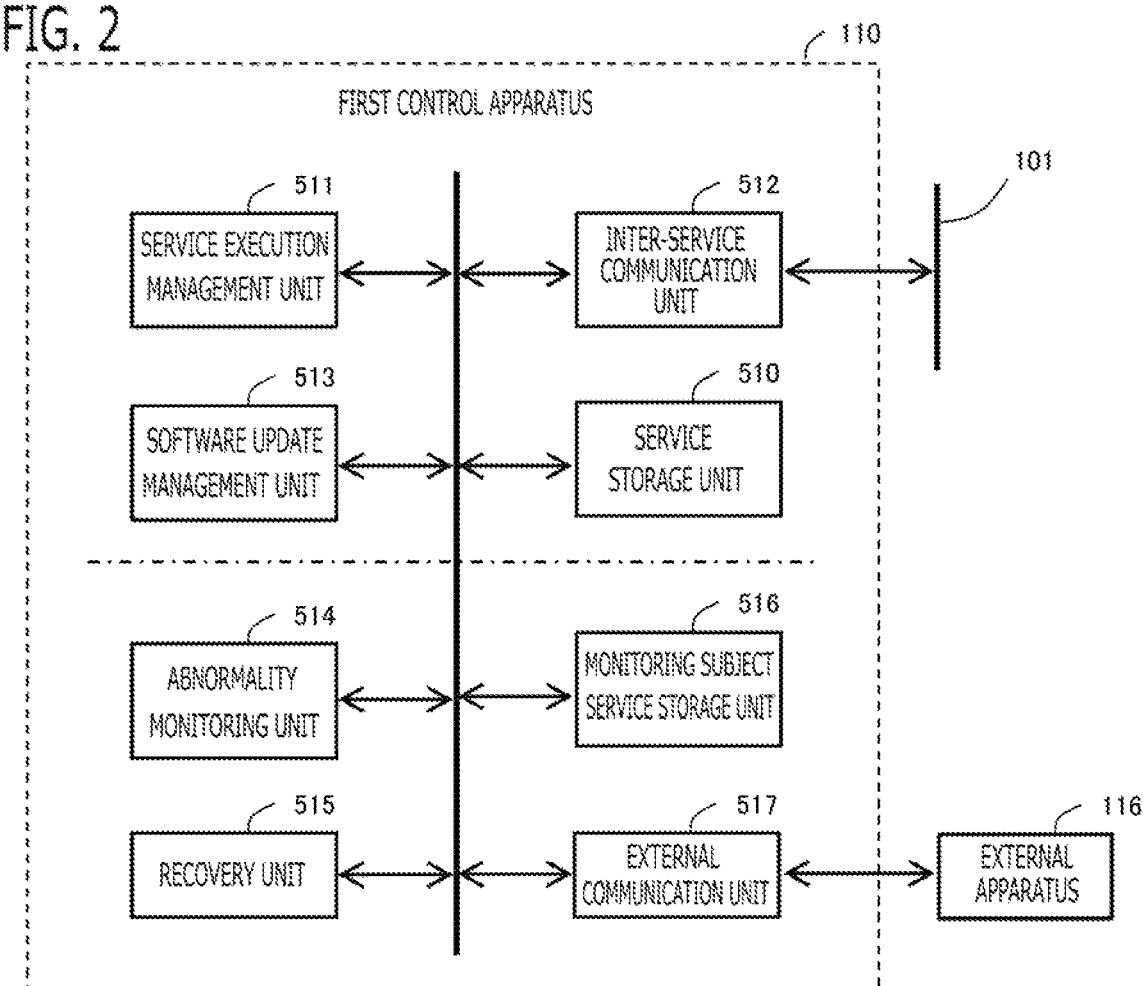
FIG. 2 is a functional block diagram of a first control apparatus according to Embodiment 1 of the present disclosure.

As represented in FIG. 2, the first control apparatus 110 includes function units such as a service storage unit 510, a service execution management unit 511, an inter-service communication unit 512, a software update management unit 513, an abnormality monitoring unit 514, a recovery unit 515, a monitoring subject service storage unit 516, an external communication unit 517, and the like.

Figure 3:
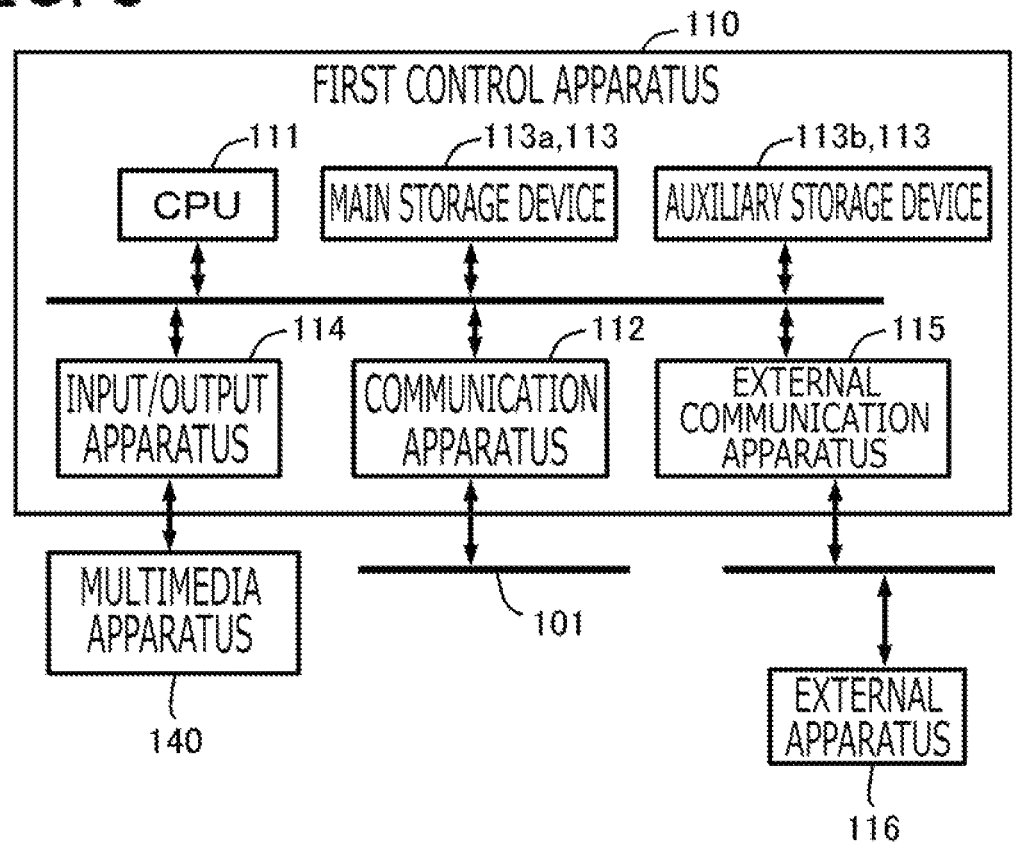
FIG. 3 is a hardware configuration diagram of the first control apparatus according to Embodiment 1 of the present disclosure.

The function units 510 through 517 and the like of the first control apparatus 110 are realized by processing circuits provided in the first control apparatus 110. For example, as represented in FIG. 3, the first control apparatus 110 includes, as the processing circuits, a computing processing unit (computer) 111 such as a CPU (Central Processing Unit), storage devices 113 that exchange data with the computing processing unit 111, a communication apparatus 112 that communicates with the other control apparatuses through the on-vehicle network, an input/output apparatus 114 that performs inputting/outputting of signals with the multimedia apparatus 140, an external communication apparatus 115 that communicates with an external apparatus 116 such as a server, and the like.

It may be allowed that as the computing processing unit 111, a DSP (Digital Signal Processor), a GPU (Graphics Processing Unit), a neuro chip, an ASIC (Application Specific Integrated Circuit), an IC (Integrated Circuit), an FPGA (Field Programmable Gate Array), each of various kinds of logic circuits, each of various kinds of signal processing circuits, or the like is provided. In addition, it may be allowed that as the computing processing unit 111, two or more computing processing units of the same type or different types are provided and respective processing items are implemented in a sharing manner. As the storage devices 113, a volatile main storage device 113a such as a RAM (Random Access Memory) and a nonvolatile auxiliary storage device 113b such as a ROM (Read Only Memory), an HDD (Hard Disk Drive), or a flash memory are utilized. The computing processing unit 111 loads data stored in the auxiliary storage device 113b into the main storage device 113a, as may be necessary; the computing processing unit 111 utilizes the data in its processing. The computing processing unit 111 stores data stored in the main storage device 113a in the auxiliary storage device 113b, as may be necessary. The communication apparatus 112 performs communication by use of a telecommunication standard such as Ethernet. The external communication apparatus 115 is connected with a network through wireless communication such as Wi-Fi (registered trademark) and performs communication with the external apparatus 116 such as a server connected with the network.

The computing processing unit 111 executes software items (programs) stored in the storage devices 113 and collaborates with other hardware members such as the storage devices 113, the input/output apparatus 114, the communication apparatus 112, the external communication apparatus 115, and the like, so that the functions of the function units 510 through 517 provided in the first control apparatus 110 are realized.

<The Second Control Apparatus 120>

Figure 4:
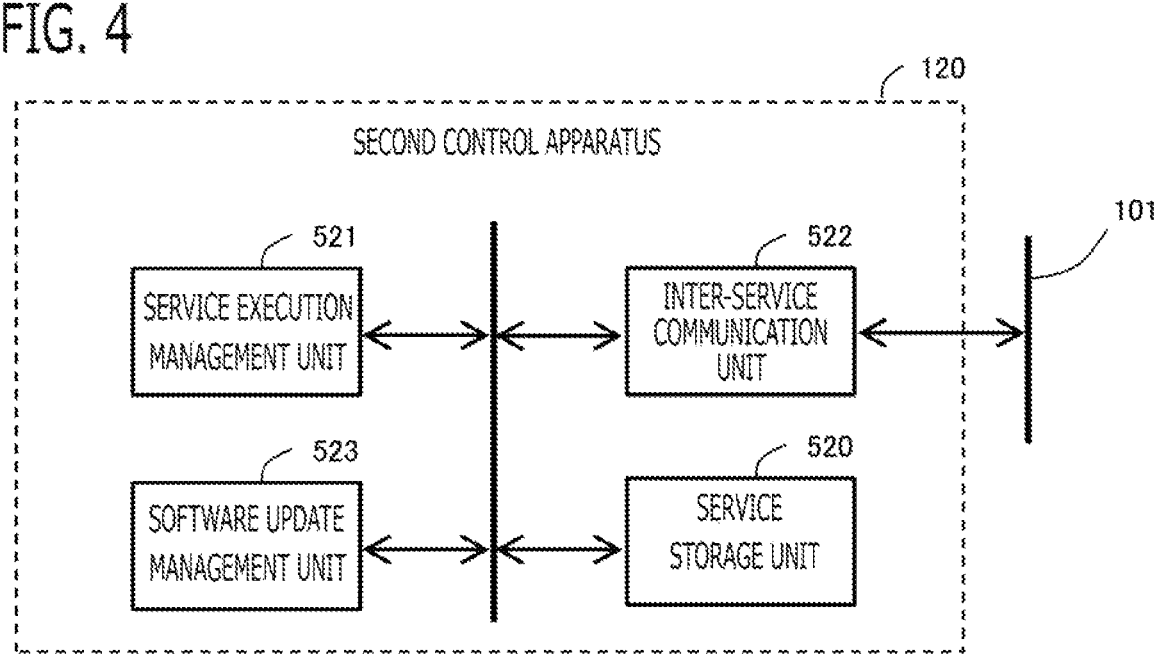
FIG. 4 is a functional block diagram of a second control apparatus according to Embodiment 1 of the present disclosure.

As represented in FIG. 4, the second control apparatus 120 includes function units such as a service storage unit 520, a service execution management unit 521, an inter-service communication unit 522, a software update management unit 523, and the like.

Figure 5:
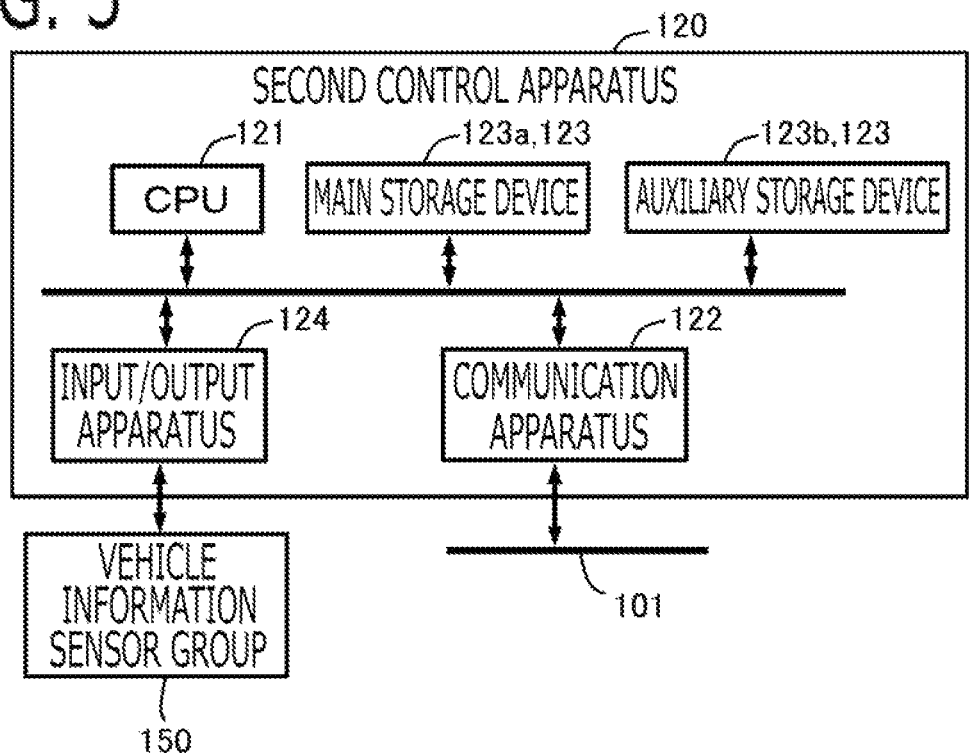
FIG. 5 is a hardware configuration diagram of the second control apparatus according to Embodiment 1 of the present disclosure.

The function units 520 through 523 and the like of the second control apparatus 120 are realized by processing circuits provided in the second control apparatus 120. For example, as represented in FIG. 5, the second control apparatus 120 includes, as the processing circuits, a computing processing unit (computer) 121 such as a CPU, storage devices 123 such as a main storage device 123a and an auxiliary storage device 123b, a communication apparatus 122 that communicates with the other control apparatuses through the on-vehicle network, an input/output apparatus 124 that performs inputting/outputting of signals with the vehicle information sensor group 150, and the like. The configurations of the processing circuits of the second control apparatus 120 are the same as those of the processing circuits of the first control apparatus 110; thus, the explanations therefor will be omitted.

The computing processing unit 121 executes software items (programs) stored in the storage devices 123 and collaborates with other hardware members such as the storage devices 123, the input/output apparatus 124, the communication apparatus 122, and the like, so that the functions of the function units 520 through 523 provided in the second control apparatus 120 are realized.

<The Third Control Apparatus 130>

Figure 6:
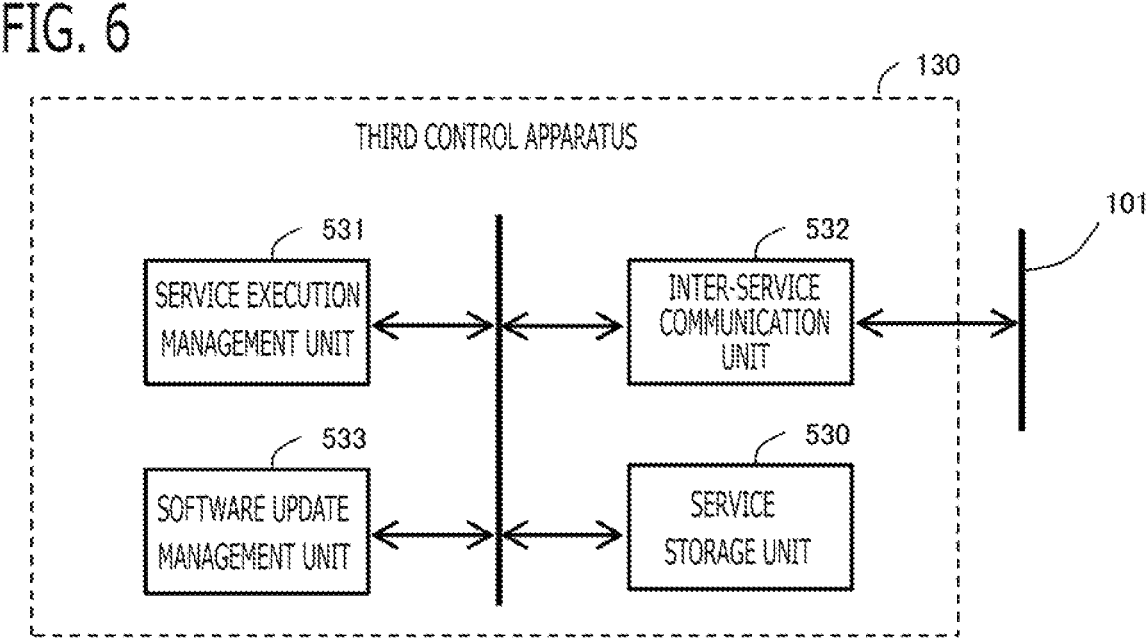
FIG. 6 is a functional block diagram of a third control apparatus according to Embodiment 1 of the present disclosure.

As represented in FIG. 6, as is the case with the second control apparatus 120, the third control apparatus 130 includes function units such as a service storage unit 530, a service execution management unit 531, an inter-service communication unit 532, a software update management unit 533, and the like.

Figure 7:
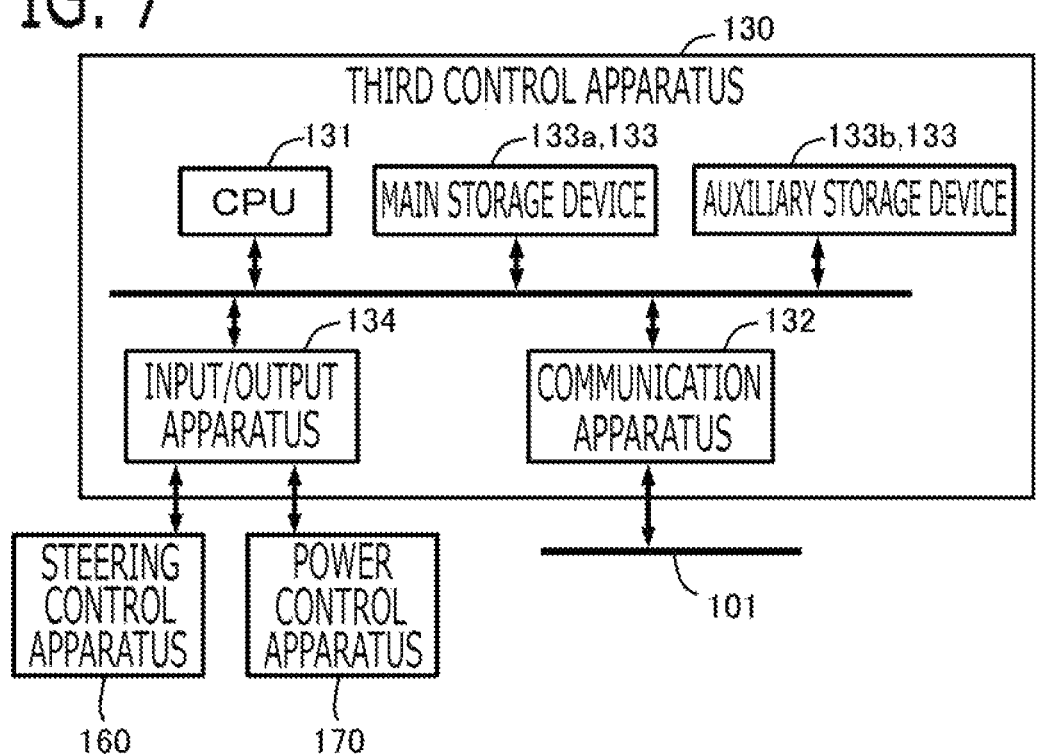
FIG. 7 is a hardware configuration diagram of the third control apparatus according to Embodiment 1 of the present disclosure.

The function units 530 through 533 and the like of the third control apparatus 130 are realized by processing circuits provided in the third control apparatus 130. For example, as represented in FIG. 7, the third control apparatus 130 includes, as the processing circuits, a computing processing unit (computer) 131 such as a CPU, storage devices 133 such as a main storage device 133a and an auxiliary storage device 133b, a communication apparatus 132 that communicates with the other control apparatuses through the on-vehicle network, an input/output apparatus 134 that performs inputting/outputting of signals with the steering control apparatus 160 and the power control apparatus 170, and the like. The configurations of the processing circuits of the third control apparatus 130 are the same as those of the processing circuits of the first control apparatus 110; thus, the explanations therefor will be omitted.

The computing processing unit 131 executes software items (programs) stored in the storage devices 133 and collaborates with other hardware members such as the storage devices 133, the input/output apparatus 134, the communication apparatus 132, and the like, so that the functions of the function units 530 through 533 provided in the third control apparatus 130 are realized.

<Two or More Services for Realizing Automatic Driving Control>

Next, a functional configuration for realizing automatic driving control of a vehicle will be explained. In automatic driving control, the peripheral environment of a vehicle is recognized through a sensor to be mounted in the vehicle or external information so that a target trajectory route and a target vehicle speed are determined; in order to achieve the target values, the steering angle and actuators related to the vehicle speed are controlled.

In the present embodiment, for the sake of simplicity, it is assumed that as the vehicle information sensor group 150, a periphery monitoring camera is utilized, that the traffic lane and a vehicle in front are detected based on data obtained by the periphery monitoring camera, that a target value is calculated from the detected information, that the steering control apparatus 160 controls the steering angle, and that the power control apparatus 170 controls actuators related to the vehicle speed.

The automatic driving control is realized by combining two or more software elements for realizing the services, which are separate functions. Each of the software elements (programs) for realizing the services is designed based on an SOA (Service Oriented Architecture). In the SOA, the services are defined by two kinds of services, i.e., by a service provider that is a service for providing service-product information to another service and by a service user that is a service for utilizing product information provided by another service. In addition, in the SOA, in the case where a service provider and a service user exist on a network, there is prescribed an interface (a protocol) for establishing communication between the service provider and the service user so that data exchange therebetween is enabled.

Figure 8:
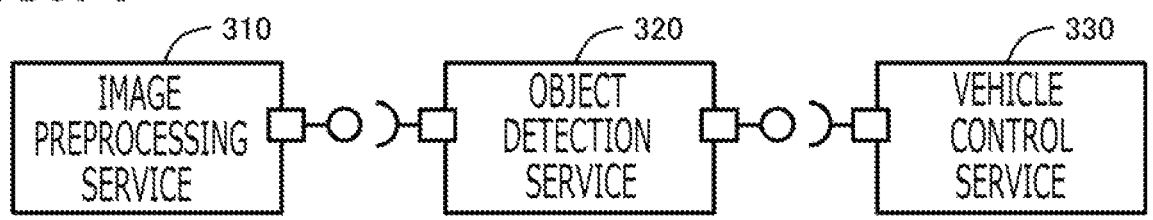
FIG. 8 is a diagram representing the relationship among monitoring subject services according to Embodiment 1 of the present disclosure.

FIG. 8 is a figure representing the image preprocessing service 310, an object detection service 320, and the vehicle control service 330, as the two or more serviced for realizing the automatic driving control, and the relationship among the services. In addition, in order to perform automatic driving control, services other than the foregoing ones are included and are arranged in the respective control apparatuses; however, for the sake of simplicity, the explanations therefor will be omitted.

The image preprocessing service 310 applies image processing to image data, taken by the periphery monitoring camera, so that object detection is readily performed, and then provides image data after image processing. For example, the image preprocessing service 310 applies, to image data, gray-scaling, threshold-value processing for setting data, at a position where a predetermined threshold value is not reached, to "0", and smoothing with a Gaussian filter or the like suitable for removing white noise; then, the image preprocessing service 310 provides the image data to which the foregoing image processing items have been applied.

The object detection service 320 obtains image data after image processing from the image preprocessing service 310, detects an object included in the image data after image processing, and then provides information on the detected object. For example, the object detection service 320 detects the position of the traffic lane on which the own vehicle travels and the position of a vehicle in front from image data after image processing, and then provides the respective positional information items on the detected traffic lane and vehicle in front.

The vehicle control service 330 obtains information on an object from the object detection service 320, calculates respective target values for the steering angle of a wheel and the vehicle speed, based on the obtained information on the object, and then provides the respective target values for the steering angle and the vehicle speed. For example, the vehicle control service 330 calculates a deviation distance of the own vehicle from the central position of a traffic lane, based on the positional information on the traffic lane, sets a steering-angle target value in a direction in which the deviation is reduced, and then determines whether or not a vehicle in front exists, based on the positional information on the vehicle in front. In the case where no vehicle in front exists, the vehicle control service 330 sets a predetermined vehicle-speed target value; in the case where a vehicle in front exists, the vehicle control service 330 sets the vehicle-speed target value in a direction in which the inter-vehicle distance between the own vehicle and the vehicle in front is kept.

Although not represented in FIG. 8, the steering control apparatus 160 obtains a steering-angle target value from the vehicle control service 330 and then controls the driving motor and the like of the electric power steering device so that the steering angle keeps track of the obtained steering-angle target value. The power control apparatus 170 obtains a vehicle-speed target value from the vehicle control service 330 and then controls the output torque of the power machine so that the vehicle speed keeps track of the obtained vehicle-speed target value.

Each of the services has a function of detecting an abnormality such as an error or a failure that occurs when the service is performed, and notifies the abnormality to the service execution management unit of the control apparatus in which the corresponding service is disposed. In this situation, the abnormalities to be detected include the one such as a CRC (Cyclic Redundancy Check) error or a failure in writing or reading data, which is caused by hardware, and the one such as buffer overflow or a failure in message authentication, which is caused by a cyber security attack.

<Execution Manifest, Communication Manifest>

An execution manifest and a communication manifest are provided in each of the two or more services. The execution manifest includes data on starting conditions for the corresponding service and resource usage information on the processing circuit to be utilized by the corresponding service. The resource usage information on the processing circuit includes a maximum usage rate (a maximum usage rate of the CPU, in this example) of the computing processing unit and a maximum memory usage amount of the main storage device such as a RAM. The communication manifest includes the identifier of the control apparatus in which the corresponding service is disposed and data on the identifier of the corresponding service.

As represented in FIG. 9, in the present embodiment, an execution manifest 311 and a communication manifest 312 for the image preprocessing service 310 is provided in the image preprocessing service 310; an execution manifest 321 and a communication manifest 322 for the object detection service 320 is provided in the object detection service 320; an execution manifest 331 and a communication manifest 332 for the vehicle control service 330 is provided in the vehicle control service 330. A set of the program of a single service and the respective files of the execution manifest and the communication manifest for the corresponding service is dealt with, as a single package.

Here, a detailed explanation will be made by use the execution manifest 311 and the communication manifest 312 for the image preprocessing service 310. The execution manifest 311 includes information on the corresponding-service starting conditions in the control apparatus in which the corresponding service is disposed. FIG. 9 represents a "machine state", as one of the information items on the starting conditions. In the case where the machine state is "under execution", the control apparatus (the second control apparatus 120, in this example) in which the image preprocessing service 310 is disposed is started, and it is indicated that the image preprocessing service 310 can be started.

The execution manifest 311 includes, as one of the information items on the starting conditions, information on a service (dependence service), which is a service that needs to be started before the corresponding service is started; this particular service is indicated, as a "dependence service", in FIG. 9. When the dependence service exists, whether or not the dependence service has been started is one of the service starting conditions. Because no dependence service exists in the image preprocessing service 310, the dependence service in the execution manifest 311 is set to "none". Therefore, the image preprocessing service 310 is started without depending on the starting states of the other services.

As described above, the execution manifest 311 includes information on the maximum usage rate (the maximum usage rate of the CPU, in this example) of the computing processing unit to be utilized for executing the execution manifest 311; this information on the maximum usage rate is indicated as the "maximum CPU usage rate" in FIG. 9. The execution manifest 311 includes information on the maximum memory usage amount of the main storage device such as a RAM to be utilized for executing the execution manifest 311; this information on the maximum memory usage amount is indicated as the "maximum memory usage amount" in FIG. 9.

As described above, the communication manifest 312 includes information on the identifier of the control apparatus in which the corresponding service is disposed; in FIG. 9, this information on the identifier is indicated, as the "IP address", which is an identifier for identifying the control apparatus on Ethernet. The communication manifest 312 includes information on the identifier of the corresponding service; the information on the identifier is indicated, as the "service ID", in FIG. 9.

Because in the present embodiment, the image preprocessing service 310 and the object detection service 320 are arranged in the second control apparatus 120, the IP addresses of the communication manifests 312 and 322 for these services are set to "192.168.1.2", which is the IP address of the second control apparatus 120. Because the vehicle control service 330 is disposed in the third control apparatus 130, the IP address of the communication manifest 332 for the vehicle control service 330 is set to "192.168.1.3", which is the IP address of the third control apparatus 130.

The software element of the image preprocessing service 310 and the execution manifest 311 and the communication manifest 312 for the image preprocessing service 310 are stored in the service storage unit 520 (e.g., the auxiliary storage device 123b such as a flash memory) of the second control apparatus 120. The software element of the object detection service 320 and the execution manifest 321 and the communication manifest 322 for the object detection service 320 are stored in the service storage unit 520 (e.g., the auxiliary storage device 123b such as a flash memory) of the second control apparatus 120. The software element of the vehicle control service 330 and the execution manifest 331 and the communication manifest 332 for the vehicle control service 330 are stored in the service storage unit 530 (e.g., the auxiliary storage device 133b such as a flash memory) of the third control apparatus 130.

<Multimedia Service, Navigation Service>

In the first control apparatus 110, there are arranged an audio service that creates an audio signal through audio reproduction or the like and provides the audio signal to an audio apparatus, a visual service that creates a video signal and provides the video signal to a video display apparatus, a car navigation service that creates and provides information on an target route for a destination, and the like. The respective software elements, execution manifests, and communication manifests for the audio service, the visual service, and the car navigation service are stored in the service storage unit 510 of the first control apparatus 110 and are executed by the first control apparatus 110. These multimedia services and the navigation service are not set as the monitoring subject service; thus the explanations therefor will be omitted, hereinafter.

<Explanation for the Function of the First Control Apparatus 110 (Specific Control Apparatus)>

The first control apparatus 110 is one of preliminarily set specific control apparatuses, the number of which is the same as or larger than one but less than the number of all of the control apparatuses. As represented in FIG. 2, the first control apparatus 110 includes the function units such as the service storage unit 510, the service execution management unit 511, the inter-service communication unit 512, the software update management unit 513, the abnormality monitoring unit 514, the recovery unit 515, the monitoring subject service storage unit 516, the external communication unit 517, and the like. Hereinafter, each of the functions will be explained.

The service storage unit 510 stores the software element of the service disposed in the first control apparatus 110, and the execution manifest and the communication manifest for the foregoing service. In the present embodiment, the service storage unit 510 is provided in the auxiliary storage device 113b of the first control apparatus 110.

The auxiliary storage device 113b of the first control apparatus 110 stores the respective software elements (programs) of the service execution management unit 511, the inter-service communication unit 512, the software update management unit 513, the abnormality monitoring unit 514, and the recovery unit 515. These software elements (programs) are loaded from the auxiliary storage device 113b into the main storage device 113a and are executed by the computing processing unit 111. The auxiliary storage device 113b also stores an OS (Operation System). At least part of the OS is loaded into the main storage device 113a and is executed by the computing processing unit 111. The data to be obtained after the execution is stored in a storage device such as the main storage device 113a, the auxiliary storage device 113b, or a register or a cache memory in the computing processing unit 111.

When the starting conditions included in the execution manifest for the service stored in the service storage unit 510 are satisfied, the service execution management unit 511 starts the foregoing service. In the present embodiment, the service execution management unit 511 is started by the OS, loads all of the execution manifests stored in the auxiliary storage device 113b into the main storage device 113a, ascertains the starting conditions of each of the services, and then starts the service whose starting conditions are satisfied.

The service execution management unit 511 has an abnormality information management function of detecting an abnormality in the service operating in the first control apparatus 110. In the present embodiment, as described above, each of the services has a function of detecting an abnormality such as an error or a failure that occurs when the service is performed, and notifies the detected abnormality to the service execution management unit of the control apparatus in which the corresponding service is disposed. The service execution management unit 511 obtains abnormality information on an error, a failure, or the like to be detected by the service operating in the first control apparatus 110.

The abnormality information management function of the service execution management unit 511 is executed by the service execution management unit 511 and operates, as an abnormality information management service 3401 that performs communication with the other services through inter-service communication on the SOA.

The inter-service communication unit 512 communicates with the other services by use of the communication manifest for the service stored in the service storage unit 510. The inter-service communication unit 512 performs product-information exchange between the service operating in the first control apparatus 110 and the other services. In the case where the service in the first control apparatus 110 is a service provider that provides service-product information, the inter-service communication unit 512 transmits to the other services a message indicating that the service-product information can be provided. Then, when receiving from another service a message indicating that said another service utilizes the product information, the inter-service communication unit 512 performs control for transmitting the product information to said another service from which the inter-service communication unit 512 has received the message.

In the case where the service in the first control apparatus 110 is a service user that utilizes product information provided by the other services, the inter-service communication unit 512 transmits to the other services a message for utilizing information on each of respective products of the other services. For example, the inter-service communication unit 512 searches messages being transmitted from the other services; when receiving from another service a message indicating that said another service can provide information on a product for a usage subject, the inter-service communication unit 512 transmits a message for utilizing the product information to said another service from which the inter-service communication unit 512 has received the message; then, the inter-service communication unit 512 receives the product information transmitted from said another service. The inter-service communication unit 512 communicates with the services arranged in the other control apparatuses, by use of the communication apparatus 112. In the case where two services that communicate with each other are provided in one and the same first control apparatus 110, the inter-service communication unit 512 performs transfer of information in the first control apparatus 110.

The software update management unit 513 applies updation, addition, and deletion to the software element and the execution and communication manifests for the service in the service storage unit 510 (provided in the auxiliary storage device 113b, in this example). In the service storage unit 510 provided in the auxiliary storage device 113b, the software update management unit 513 stores the software element and the execution and communication manifests for the service transferred thereto from another control apparatus or the own control apparatus. When receiving a service deletion request from the recovery unit 515, the software update management unit 513 issues a service stopping request to the service execution management unit 511, and deletes the software element and the execution and communication manifests for the service—for which the software update management unit 513 has received the service deletion request—stored in the service storage unit 510.

When the recovery unit 515 transfers the software element and the execution and communication manifests for the monitoring subject service from the monitoring subject service storage unit 516 to the relocation control apparatus, the transfer may be performed through the software update management unit 513. In other words, it may be allowed that in accordance with a command from the recovery unit 515, the software update management unit 513 reads the software element and the like for the monitoring subject service from the monitoring subject service storage unit 516 and transfers the read software element and the like to the relocation control apparatus.

The monitoring subject service storage unit 516 stores, for the purpose of recovery, the software element and the execution and communication manifests for the monitoring subject service, which is a preliminarily set service. In the present embodiment, the monitoring subject service storage unit 516 is provided in the auxiliary storage device 113b of the first control apparatus 110. For example, a service required to make the control communication system at least function is set to the monitoring subject service. In order to reduce the storage capacity, the software element and the like for the monitoring subject service may be compressed and then stored in the auxiliary storage device 113b; alternatively, the software element and the like therefor may be stored in the auxiliary storage device 113*b* after the service contents to be included in the monitoring subject service are limited so as to reduce the volume of the software.

In the present embodiment, each of the services necessary for performing automatic driving of an automobile, i.e., each of the image preprocessing service 310, the object detection service 320, and the vehicle control service 330 is preliminarily set to the monitoring subject service.

The abnormality monitoring unit 514 detects whether or not an abnormality related to the monitoring subject service exists. The abnormality monitoring unit 514 collects, as an abnormality related to the monitoring subject service, abnormality information, on the monitoring subject service, that is detected by the service execution management unit of the control apparatus in which the monitoring subject service is disposed. The abnormality monitoring unit 514 detects, as an abnormality related to the monitoring subject service, whether or not an abnormality exists in the inter-service communication between the monitoring subject service and the other services, performed by the inter-service communication unit. For example, in the case where in the inter-service communication between the monitoring subject service and the other services, transmission of a message indicating that product information can be provided stops or transmission of a message indicating that product information is to be utilized stops, the abnormality monitoring unit 514 determines that an abnormality has occurred.

In the present embodiment, when detecting an abnormality related to the monitoring subject service, the abnormality monitoring unit 514 issues a request for information on the resource-usage state of the processing circuit in each of the control apparatuses to the service execution management unit of each of the control apparatuses, and then obtains the information on the resource-usage state transmitted from each of the control apparatuses. The resource-usage state includes the present usage rate of the computing processing unit (the usage rate of the CPU, in this example) and the present memory usage amount of the main storage device such as a RAM.

After the recovery unit 515, described later, transfers to the relocation control apparatus the software element and the execution and communication manifests for the monitoring subject service in which an abnormality has been detected, the abnormality monitoring unit 514 issues a request for information on the resource-usage state of the processing circuit in the relocation control apparatus to the relocation control apparatus, obtains the information on the resource-usage state transmitted from the relocation control apparatus, and then determines, based on the information on the resource-usage state of the relocation control apparatus, whether or not the transferred monitoring subject service has normally started. Specifically, in the case where the resource-usage state of the relocation control apparatus at a time after the recovery processing by the recovery unit 515 corresponds to the sum of the resource-usage state of the relocation control apparatus and the resource usage information on the monitoring subject service at a time before the recovery processing, the abnormality monitoring unit 514 determines that the monitoring subject service has normally started; in the case where the foregoing resource-usage state of the relocation control apparatus does not correspond to the foregoing sum, the abnormality monitoring unit 514 determines that the monitoring subject service has not normally started. When determining that the monitoring subject service has not normally started, the abnormality monitoring unit 514 determines that an abnormality related to the monitoring subject service has occurred, and makes the recovery unit 515 select another relocation control apparatus and execute recovery processing.

These functions of the abnormality monitoring unit 514 are executed by the service execution management unit 511 and operate, as an abnormality monitoring service 350 that performs communication with the other services through inter-service communication on the SOA.

In the case where the abnormality monitoring unit 514 detects an abnormality related to the monitoring subject service, the recovery unit 515 selects a relocation control apparatus, which is another control apparatus to which the monitoring subject service in which the abnormality has been detected is relocated from the control apparatus where the foregoing monitoring subject service is currently disposed. Then, through the software update management unit 513, the recovery unit 515 transfers the software element and the execution and communication manifests for the monitoring subject service in which the abnormality has been detected, from the monitoring subject service storage unit 516 to the service storage unit of the relocation control apparatus, and then makes the service storage unit of the relocation control apparatus store the foregoing software element and the execution and communication manifests.

In the present embodiment, based on information, about the resource-usage state of each of the control apparatuses, that has been obtained by the abnormality monitoring unit 514 and on resource usage information included in the execution manifest for the monitoring subject service in which an abnormality has been detected, the recovery unit 515 determines the control apparatuses, each of which contains the resources to be utilized by the monitoring subject service in which the abnormality has been detected, and then selects one of the determined control apparatuses, as the relocation control apparatus.

When determining that there exists no control apparatus that can contain the resources to be utilized by the monitoring subject service in which the abnormality has been detected, the recovery unit 515 stops execution of the services other than the monitoring subject service, secures the control apparatus that can contain the resources to be utilized by the monitoring subject service in which the abnormality has been detected, and then selects the secured control apparatus, as the relocation control apparatus.

After rewriting the control-apparatus identifier in the communication manifest for the monitoring subject service in which the abnormality has been detected with the identifier of the relocation control apparatus, the recovery unit 515 transfers, through the software update management unit, the software element and the execution and communication manifests for the monitoring subject service in which the abnormality has been detected to the service storage unit of the relocation control apparatus, and then makes the service storage unit of the relocation control apparatus store the foregoing software element and the execution and communication manifests. For example, the recovery unit 515 transfers the software element and the like for the monitoring subject service in which an abnormality has been detected to the software update management unit of the relocation control apparatus, through the software update management unit 513 of the first control apparatus 110; then, the software update management unit of the relocation control apparatus stores the transferred software element and the like for the monitoring subject service in the service storage unit of the relocation control apparatus.

When the starting conditions included in the execution manifest for the monitoring subject service stored in the service storage unit are satisfied, the service execution management unit of the relocation control apparatus starts the foregoing monitoring subject service.

The recovery unit 515 deletes the software element and the execution and communication manifests for the monitoring subject service from the service storage unit of the control apparatus in which the monitoring subject service—in which the abnormality has been detected—has been executed (hereinafter, referred to as an abnormality-detected control apparatus), through the software update management unit. For example, the recovery unit 515 transmits a command for deleting the monitoring subject service in which an abnormality has been detected to the software update management unit of the abnormality-detected control apparatus; then, the software update management unit of the abnormality-detected control apparatus deletes the software element and the like for the monitoring subject service—in which an abnormality has been detected—from the service storage unit of the abnormality-detected control apparatus.

The monitoring subject service storage unit for storing the monitoring subject service and the execution and communication manifests for the monitoring subject service may be provided not in the first control apparatus 110 but in an external server. In that case, it may be allowed that through the external communication unit 517, the recovery unit 515 obtains, from the external server, the monitoring subject service in which an abnormality has been detected and the execution and communication manifests for the monitoring subject service, transfers the monitoring subject service in which an abnormality has been detected and the execution and communication manifests for the monitoring subject service to the service storage unit of the relocation control apparatus, and then makes the service storage unit of the relocation control apparatus store the monitoring subject service in which an abnormality has been detected and the execution and communication manifests for the monitoring subject service. The external communication unit 517 communicates with the external apparatus 116 such as a server, by use of the external communication apparatus 115.

The function of the recovery unit 515 is executed by the service execution management unit 511 and operates, as a recovery service 360 that performs communication with the other services through inter-service communication on the SOA.

<Explanation for the Function of the Second Control Apparatus 120>

As represented in FIG. 4, the second control apparatus 120 includes function units such as the service storage unit 520, the service execution management unit 521, the inter-service communication unit 522, the software update management unit 523, and the like. Because being not the specific control apparatus, the second control apparatus 120 is provided with none of an abnormality monitoring unit, a recovery unit, a monitoring subject service storage unit, an external communication unit, and the like. The function units 520 through 523 of the second control apparatus 120 are the same as the function units 510 through 513 of the first control apparatus 110; thus, the explanations therefor will be omitted.

<Explanation for the Function of the Third Control Apparatus 130>

As represented in FIG. 6, the third control apparatus 130 includes function units such as the service storage unit 530, the service execution management unit 531, the inter-service communication unit 532, the software update management unit 533, and the like. Because being not the specific control apparatus, the third control apparatus 130 is provided with none of an abnormality monitoring unit, a recovery unit, a monitoring subject service storage unit, an external communication unit, and the like. The function units 530 through 533 of the third control apparatus 130 are the same as the function units 510 through 513 of the first control apparatus 110; thus, the explanations therefor will be omitted.

<Explanations for the Abnormality Information Management Service, the Abnormality Monitoring Service, and the Recovery Service>

In the present embodiment, as described above, the service execution management units 511, 521, and 531 of the three control apparatuses and the abnormality monitoring unit 514 and the recovery unit 515 of the first control apparatus 110 are executed by the respective service execution management units of the corresponding control apparatuses, and operate as the abnormality information management services 3401, 3402, and 3404, the abnormality monitoring service 350, and the recovery service 360, each of which communicates with the other services through inter-service communication on the SOA.

FIG. 10 represents the relationship among the abnormality information management service 3401 of the first control apparatus 110, an abnormality information management service 3402 of the second control apparatus 120, an abnormality information management service 3403 of the third control apparatus 130, the abnormality monitoring service 350, and the recovery service 360. The three abnormality information management services 3401, 3402, and 3403 are connected with the abnormality monitoring service 350; the abnormality monitoring service 350 is connected with the recovery service 360.

FIG. 11 represents the respective execution and communication manifests for the three abnormality information management services 3401, 3402, and 3403, the abnormality monitoring service 350, and the recovery service 360.

The software element and the execution manifest 3411 and the communication manifest 3421 for the abnormality information management service 3401 of the first control apparatus 110 are stored in the service storage unit 510 (the auxiliary storage device 113b, in this example) of the first control apparatus 110. The software element, the execution manifest 351, and the communication manifests 352 for the abnormality monitoring service 350 and the software element, the execution manifest 361, and the communication manifest 362 for the recovery service 360 are stored in the service storage unit 510 (the auxiliary storage device 113b, in this example) of the first control apparatus 110. The software element, the execution manifest 3412, and the communication manifest 3422 for the abnormality information management service 3402 of the second control apparatus 120 are stored in the service storage unit 520 (the auxiliary storage device 123b, in this example) of the second control apparatus 120. The software element, the execution manifest 3413, and the communication manifest 3423 for the abnormality information management service 3403 of the third control apparatus 130 are stored in the service storage unit 530 (the auxiliary storage device 133b, in this example) of the third control apparatus 130.

<Operation of Automatic Driving Control at Normal Time>

At first, the operation of automatic driving control at a normal time will be explained. When the power source for a vehicle is turned on, the OS stored in the auxiliary storage device 113b of the first control apparatus 110 is loaded into the main storage device 113a and then is executed by the computing processing unit 111. When being executed, the OS loads the program of the service execution management unit 511, stored in the auxiliary storage device 113b, into the auxiliary storage device 113*b* and starts execution of the foregoing program, as a process under the management of the OS. Next, the service execution management unit 511 loads the program of the inter-service communication unit 512, stored in the auxiliary storage device 113*b*, into the auxiliary storage device 113*b* and starts the inter-service communication unit 512. Similarly, the service execution management unit 511 loads the program of the software update management unit 513, stored in the auxiliary storage device 113*b*, into the auxiliary storage device 113*b* and starts the software update management unit 513.

Also with regard to the second control apparatus 120 and the third control apparatus, as is the case with the procedure in the first control apparatus, the respective OSs are started in the second control apparatus 120 and the third control apparatus; then, the service execution management unit 521 and 531, the inter-service communication units 522 and 532, and the software update management units 523 and 533 are started.

Figure 12:
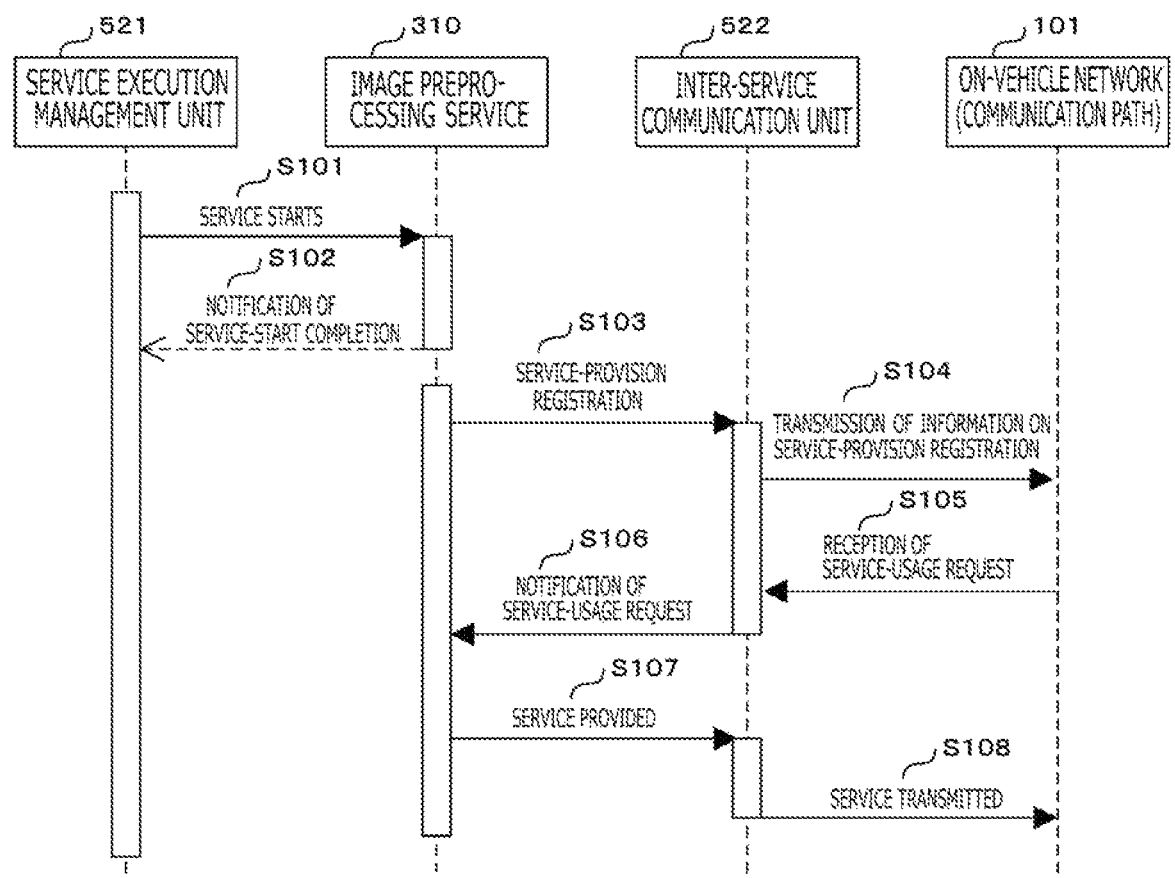
FIG. 12 is a sequence diagram of an image preprocessing service according to Embodiment 1 of the present disclosure.
Figure 13:
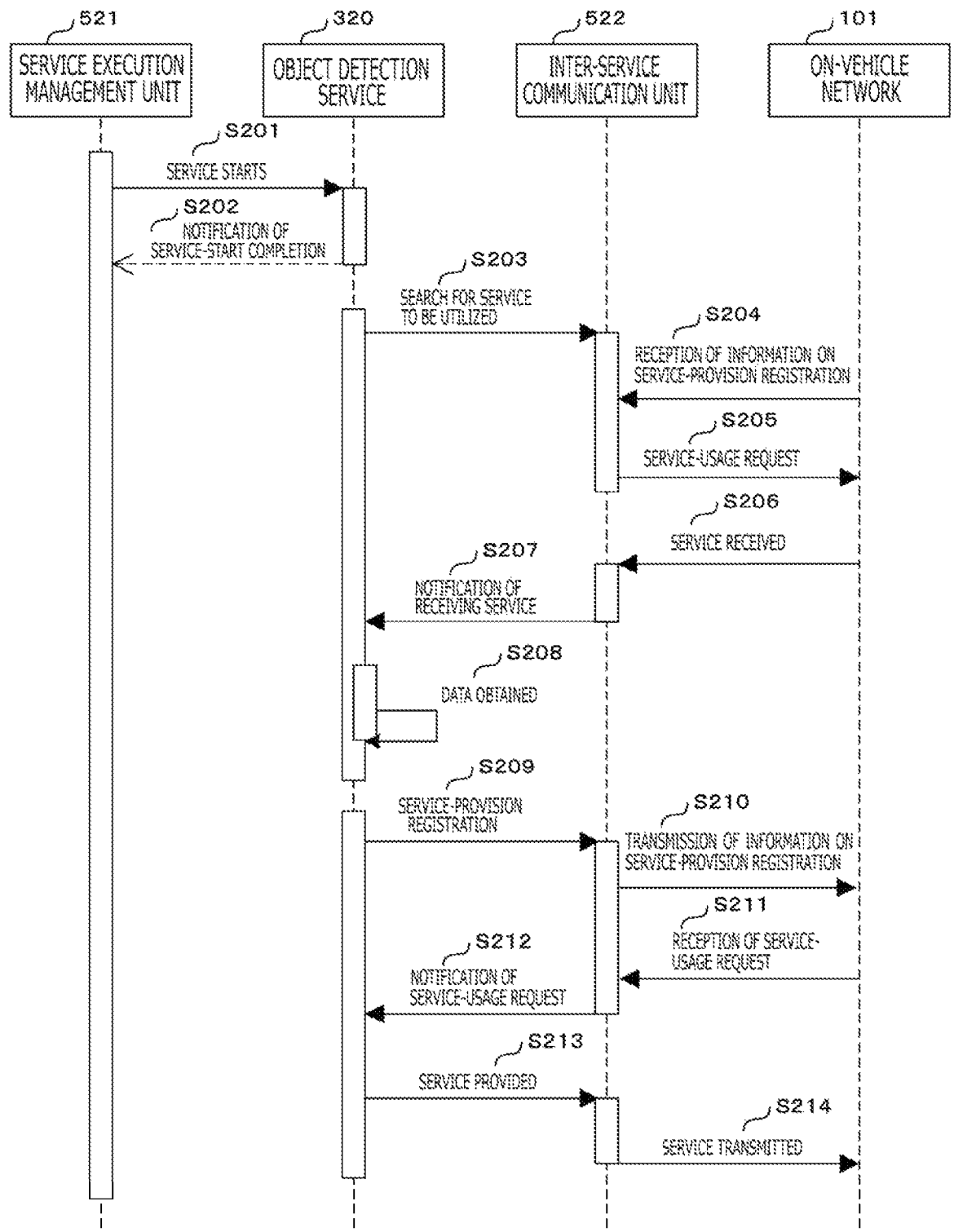
FIG. 13 is a sequence diagram of an object detection service according to Embodiment 1 of the present disclosure.
Figure 14:
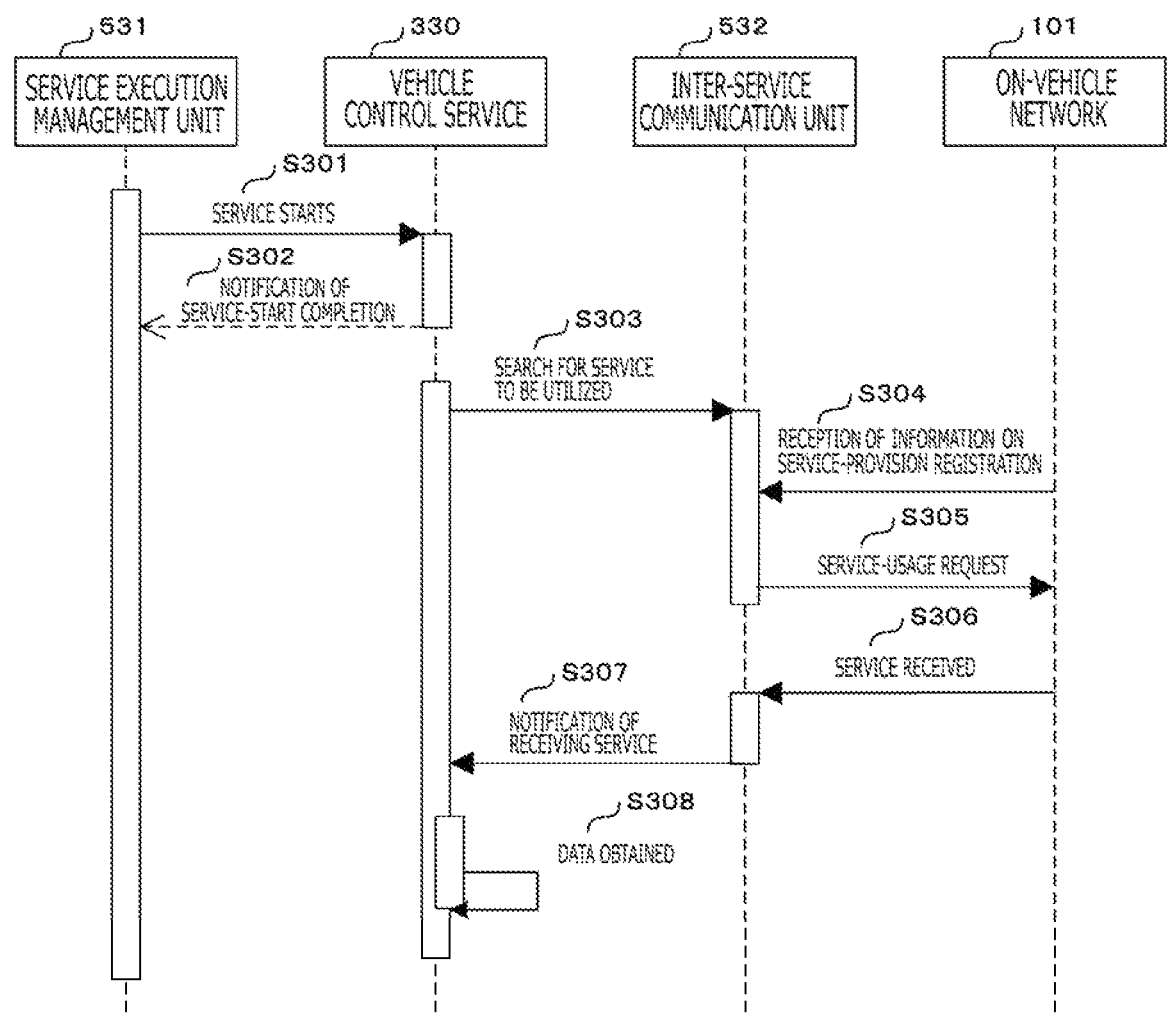
FIG. 14 is a sequence diagram of a vehicle control service according to Embodiment 1 of the present disclosure.

Each of FIGS. 12 and 13 is a sequence diagram representing the operation performed by the second control apparatus 120 after the service execution management unit 521, the inter-service communication unit 522, and the software update management unit 523 are started. Similarly, FIG. 14 is a sequence diagram representing the operation performed by the third control apparatus 130 after the service execution management unit 531, the inter-service communication unit 532, and the software update management unit 533 are started.

At first, the operation performed by the image preprocessing service 310 disposed in the second control apparatus 120 will be explained by use of FIG. 12.

In the step S101, the service execution management unit 521 loads the execution manifest 311 for the image preprocessing service 310, stored in the service storage unit 520 (the auxiliary storage device 123*b*, in this example) of the second control apparatus 120, into the main storage device 123*a*, ascertains the starting conditions of the image preprocessing service 310, and then starts the image preprocessing service 310 when the starting conditions are satisfied.

In the step S102, the image preprocessing service 310 notifies the service execution management unit 521 that the starting has normally be completed.

In the step S103, the image preprocessing service 310 issues to the inter-service communication unit 522 a request for service-providable registration indicating that service-product information (image data after image processing, in this example) is providable.

In the step S104, the inter-service communication unit 522 that has received a request for service-providable registration from the image preprocessing service 310 transmits to each of the control apparatuses a message indicating that the image preprocessing service 310 can provide the service. The message transmission to each of the control apparatuses is performed, for example, through a multicast method; the message includes the identifier 0x01 of the image preprocessing service 310 included in the communication manifest 312 for the image preprocessing service 310, stored in the service storage unit 520 (the auxiliary storage device 123*b*), and the IP address 192.168.1.2 of the second control apparatus 120 in which the image preprocessing service 310 is disposed. Unless the image preprocessing service 310 is stopped or a request for stopping the image preprocessing service 310 is issued, the message of service-providable registration is transmitted to each of the control apparatuses in a predetermined period, so that it can be ascertained that the image preprocessing service 310 is providable.

Next, in the step S105, the inter-service communication unit 522 receives a message indicating that there exists a service that utilizes the image preprocessing service 310 transmitted in the step S205 represented in after-mentioned FIG. 13. The received message includes the IP address of the control apparatus in which the service that utilizes the image preprocessing service 310 is disposed.

In the step S106, the inter-service communication unit 522 notifies the image preprocessing service 310 that there exists a service that utilizes the image preprocessing service 310.

In the step S107, the image preprocessing service 310 applies image processing to image data, taken by the before-mentioned periphery monitoring camera, so that object detection is readily performed, and then creates image data after image processing.

In the step S108, based on the IP address received in the step S105, the inter-service communication unit 522 transmits the image data created in the step S107 to the control apparatus in which the service that utilizes the image preprocessing service 310 is disposed.

Next, the operation performed by the object detection service 320 disposed in the second control apparatus 120 will be explained by use of FIG. 13.

In the step S201, the service execution management unit 521 loads the execution manifest 321 for the object detection service 320, stored in the service storage unit 520 (the auxiliary storage device 123*b*, in this example) of the second control apparatus 120, into the main storage device 123*a*, ascertains the starting conditions of the object detection service 320, and then starts the object detection service 320 when the starting conditions are satisfied.

In the step S202, the object detection service 320 notifies the service execution management unit 521 that the starting has normally be completed.

In the step S203, the object detection service 320 issues to the inter-service communication unit 522 a request for searching another service (the image preprocessing service 310, in this example) that provides product information (image data after image processing, in this example) to be utilized. In the step S204, the inter-service communication unit 522 that has received the request for searching the image preprocessing service 310 waits for a message indicating that the image preprocessing service 310 is providable, and then receives the message indicating that the image preprocessing service 310 transmitted in the step S104 represented in FIG. 12 is providable.

In the step S205, when receiving the message indicating that the image preprocessing service 310 is providable, the inter-service communication unit 522 obtains the IP address 192.168.1.2 of the second control apparatus 120 in which the image preprocessing service 310 included in the message indicating that the service is providable, and then transmits to the second control apparatus 120 a message expressing intention to utilize the image preprocessing service 310. The service-usage requesting message includes the IP address 192.168.1.2 of the second control apparatus 120 in which the object detection service 320 included in the communication manifest 322 for the object detection service 320, stored in the service storage unit 520 (the auxiliary storage device 123*b*), is disposed.

Unless the object detection service 320 is stopped or a service-search stopping request is issued, the steps S203 through S205 are performed in a predetermined period, so that it is periodically indicated to the image preprocessing service 310 that there exists a service that utilizes the image preprocessing service 310.

Next, in the step S206, the inter-service communication unit 522 receives image data transmitted by the image preprocessing service 310 in the step S108 represented in FIG. 12, and then stores the image data in the main storage device 123*a* or the auxiliary storage device 123*b*.

In the step S207, the inter-service communication unit 522 notifies the object detection service 320 that the image data transmitted by the image preprocessing service 310 has been received.

In the step S208, the object detection service 320 obtains the image data that has been stored in the main storage device 123*a* or the auxiliary storage device 123*b* by the inter-service communication unit 522 in the step S206.

In this regard, however, because the object detection service 320 and the image preprocessing service 310 are arranged in one and the same second control apparatus 120, transmission and reception of messages and data items through the inter-service communication unit 522 are not required; thus, exchange of messages and data items may be performed through the main storage device 123*a* or the auxiliary storage device 123*b*.

Next, in the step S209, the object detection service 320 issues to the inter-service communication unit 522 a request for service-providable registration indicating that service-product information (information on the detected object, in this example) is providable.

In the step S210, the inter-service communication unit 522 that has received the request for service-providable registration from the object detection service 320 transmits to each of the control apparatuses a message indicating that the object detection service 320 can provide the service. The message transmission to each of the control apparatuses is performed, for example, through a multicast method; the message includes the identifier 0x02 of the object detection service 320 included in the communication manifest 322 for the object detection service 320, stored in the service storage unit 520 (the auxiliary storage device 123*b*), and the IP address 192.168.1.2 of the second control apparatus 120 in which the object detection service 320 is disposed. Unless the object detection service 320 is stopped or a request for stopping the object detection service 320 is issued, the message of service-providable registration is transmitted to each of the control apparatuses in a predetermined period, so that it can be ascertained that the object detection service 320 is providable.

Next, in the step S211, the inter-service communication unit 512 receives a message indicating that there exists a service that utilizes the object detection service 320 transmitted in the step S305 represented in after-mentioned FIG. 14. The received message includes the IP address 192.168.1.3 of the third control apparatus 130, which is a control apparatus in which the service that utilizes the object detection service 320 is disposed.

In the step S212, the inter-service communication unit 522 notifies the object detection service 320 that there exists a service that utilizes the object detection service 320.

In the step S213, the object detection service 320 utilizes image data, transmitted from the image preprocessing service 310 in the step S208, so as to detect an object included in the image data, and then provides information on the detected object. For example, the object detection service 320 detects the position of the traffic lane on which the own vehicle travels and the position of a vehicle in front from image data, and then calculates the respective positional information items on the detected traffic lane and vehicle in front.

In the step S214, based on the IP address received in the step S211, the inter-service communication unit 522 transmits information on the detected object (e.g., the respective positional information items on the traffic lane and the vehicle in front) calculated in the step S213 to the control apparatus in which the service that utilizes the object detection service 320 is disposed.

Next, the operation performed by the vehicle control service 330 disposed in the third control apparatus 130 will be explained by use of FIG. 14.

In the step S301, the service execution management unit 531 loads the execution manifest 331 for the vehicle control service 330, stored in the service storage unit 530 (the auxiliary storage device 133*b*, in this example) of the third control apparatus 130, into the main storage device 133*a*, ascertains the starting conditions of the vehicle control service 330, and then starts the vehicle control service 330 when the starting conditions are satisfied.

In the step S302, the image vehicle control service 330 notifies the service execution management unit 531 that the starting has normally be completed.

In the step S303, the vehicle control service 330 issues to the inter-service communication unit 532 a request for searching another service (the object detection service 320, in this example) that provides product information (information on the detected object, in this example) to be utilized.

In the step S304, the inter-service communication unit 532 that has received the request for searching the object detection service 320 waits for a message indicating that the object detection service 320 is providable, and then receives the message indicating that the object detection service 320 transmitted in the step S204 represented in FIG. 13 is providable.

In the step S305, when receiving the message indicating that the object detection service 320 is providable, the inter-service communication unit 532 obtains the IP address 192.168.1.2 of the second control apparatus 120 in which the object detection service 320 included in the message indicating that the service is providable, and then transmits to the second control apparatus 120 a message expressing intention to utilize the object detection service 320. The service-usage requesting message includes the IP address 192.168.1.3 of the third control apparatus 130 in which the vehicle control service 330 included in the communication manifest 332 for the vehicle control service 330, stored in the service storage unit 530 (the auxiliary storage device 133*b*, in this example), is disposed.

Unless the vehicle control service 330 is stopped or a service-search stopping request is issued, the steps S303 through S305 are performed in a predetermined period, so that it is periodically indicated to the object detection service 320 that there exists a service that utilizes the vehicle control service 330.

Next, in the step S306, the inter-service communication unit 532 receives the respective positional information items on the traffic lane and the vehicle in front, transmitted by the object detection service 320 in the step S214 represented in FIG. 13, and then stores the positional information items in the main storage device 133*a* or the auxiliary storage device 133*b*.

In the step S307, the inter-service communication unit 532 notifies the vehicle control service 330 that the data transmitted by the object detection service 320 has been received.

In the step S308, the vehicle control service 330 obtains the respective positional information items on the traffic lane and the vehicle in front that have been stored in the main storage device 133a or the auxiliary storage device 133b by the inter-service communication unit 532 in the step S306.

Although not represented in the drawing, after implementation of the step S308, the vehicle control service 330 calculates a deviation distance from the central position of a traffic lane, based on the obtained positional information on the traffic lane, and then sets a steering-angle target value in a direction in which the deviation is reduced; based on the similarly obtained positional information on the vehicle in front, in the case where no vehicle in front exists, the vehicle control service 330 sets a target value for maintaining a specific vehicle speed; in the case where a vehicle in front exists, the vehicle control service 330 sets a vehicle-speed target value in a direction in which a specific inter-vehicle distance is kept. After that, the respective set target values are transmitted to the steering control apparatus 160 and to the power control apparatus 170; then, each of the foregoing control apparatuses controls the actuator so as to satisfy the obtained target value.

In the present embodiment, with regard to the steps represented in FIGS. 12 through 14, each of the processing ranging from the step S103 to the step S108 and the processing ranging from the step S209 to the step S214 is processing for providing service-product information on the SOA; each of the processing ranging from the steps S203 through S207 and the processing ranging from the steps S303 through S307 is processing for utilizing service-product information on the SOA. The respective inter-service communication events are realized by executing these processing items. The respective inter-service communication events in the abnormality information management service, the abnormality monitoring service, and the recovery service, which are explained below, are performed through the same procedure.

<The Operation of Recovery Processing at a Time when an Abnormality Occurs>

Next, by use of FIGS. 15 through 18, there will be explained a method in which an abnormality in the monitoring subject services are monitored and then the monitoring subject service in which an abnormality has been detected is relocated in another control apparatus so that recovery of the monitoring subject service is performed.

FIG. 15 is a drawing representing a flow related to initial processing for performing recovery.

In the step S401, the abnormality information management service provided in each of the respective service execution management units of the control apparatuses are started. Specifically, when an automobile is started and then execution of the service execution management unit 521 and the inter-service communication unit 522 is started in the second control apparatus 120, the service execution management unit 521 loads the program for the abnormality information management service 3402, stored in the auxiliary storage device 123b, into the main storage device 123a so as to start the abnormality information management service 3402. After being started, the abnormality information management service 3402 issues to the inter-service communication unit 522 a request for service-providable registration indicating that abnormality information is providable. The operation hereto is the same as each of the operation in the steps S101 through S104 in FIG. 12 and the operation in the steps S202, S202, S209, and S210 in FIG. 13. Also in the first control apparatus 110 and the third control apparatus 130, the abnormality information management service 3401 and 3403, respectively, are started through the same procedure.

The process ranging from the step S402 to the step S404, described below, is operation performed by the first control apparatus 110.

In the step S402, the service execution management unit 511 in the first control apparatus 110 loads the program, stored in the auxiliary storage device 113b of the first control apparatus 110, for the abnormality monitoring service 350 that functions, as the abnormality monitoring unit 514, into the main storage device 113a, so that the abnormality monitoring service 350 is started. The abnormality monitoring service 350 issues to the inter-service communication unit 512 a request for utilizing abnormality information items to be provided by the abnormality information management service 3401 through 3403 that operate in the respective control apparatuses. In the step S401, the abnormality information management service 3401 through 3403 of the respective control apparatuses have each transmitted a message indicating that the service is providable; therefore, in the step S402, there is established inter-service communication in which provision and utilization of abnormality information are performed between the abnormality monitoring service 350 and each of the abnormality information management service 3401 through 3403.

In the step S403, the service execution management unit 511 in the first control apparatus 110 loads the program, stored in the auxiliary storage device 113b, for the recovery service 360 that functions, as the recovery unit 515, into the main storage device 113a, so that the recovery service 360 is started. The recovery service 360 is in a standby state until the abnormality monitoring service 350 detects an abnormality in any one of the services.

In the step S404, the abnormality monitoring service 350 issues, to the abnormality information management service 3401 through 3403 to each of which a request for utilization is issued in the step S402, a request for providing abnormality information on the monitoring subject service operating in each of the respective control apparatuses in which the abnormality information management service 3401 through 3403 are arranged.

In the step S405, the abnormality information management services 3401 through 3403 inquire of the service execution management unit 511, 521, and 531, respectively, whether or not an abnormality related to the monitoring subject service exists, and then transmit whether or not an abnormality exists and the identifier of the monitoring subject service to the abnormality monitoring service 350. In the case where an abnormality has occurred in the monitoring subject service, information on the contents of the abnormality may also be transmitted. Specifically, in the second control apparatus 120, the abnormality information management service 3402 collects abnormality information items on the image preprocessing service 310 and the object detection service 320, which are the monitoring subject services operating in the second control apparatus 120, from the service execution management unit 521, and then transmits the abnormality information items to the abnormality monitoring service 350 in the first control apparatus 110. Also in each of the other control apparatuses, the abnormality information management service thereof transmits abnormality information items on the respective monitoring subject services operating in that particular control apparatus to the abnormality monitoring service 350 through the same procedure.

In the step S406, when having received information items related to an abnormality from the abnormality information management services 3401 through 3403, the abnormality monitoring service 350 creates a database, as represented in FIG. 16, that is a list of states of the monitoring subject services, related to the abnormality, and then stores the database in the main storage device 113a or the auxiliary storage device 113b of the first control apparatus 110. Because when transmitting the abnormality information, each of the abnormality information management services 3401 through 3403 transmits the IP address of the control apparatus in which the particular abnormality information management service is disposed, this IP address is also recorded in the database; thus, it can be comprehended in which control apparatus each of the monitoring subject services is disposed.

Moreover, the abnormality monitoring service 350 collects messages, indicating that service-product information is providable, that are being transmitted from the monitoring subject service to the other services; in the case where transmission of this message is stopped, the abnormality monitoring service 350 determines that an abnormality related to the monitoring subject service has occurred. Moreover, the abnormality monitoring service 350 collects messages, indicating that service-product information is utilized, that are being transmitted from the monitoring subject service to the other services; in the case where transmission of this message is stopped, the abnormality monitoring service 350 determines that an abnormality related to the monitoring subject service has occurred.

The database represented in FIG. 16 is an example of database that is created by the abnormality monitoring service 350 in the step S406. A database 400a at the upper stage of FIG. 16 is a database to be created in the step S406; a database 400b at the middle stage is a database at a time after an abnormality has occurred in the after-mentioned object detection service 320 and the database 400a at the upper stage has been updated; a database 400c at the lower stage is a database at a time after the disposition of the object detection service 320 has been changed so as to update the database 400b at the middle stage.

Next, the operation at a time when an abnormality has occurred will be explained by use of FIG. 17.

In the step S411, the abnormality monitoring service 350 ascertains the information, on whether or not there exists an abnormality related to the monitoring subject service, that is transmitted from each of the abnormality information management services 3401 through 3403. In the case where no abnormality information has been received, the step S411 is followed by the step S412; in the case where abnormality information has been received, the step S411 is followed by the step S413. Specifically, when detecting an abnormality, the object detection service 320 disposed in the second control apparatus 120 notifies the service execution management unit 521 of the second control apparatus 120 of the abnormality. Then, the abnormality information management service 3402 in the second control apparatus 120 transmits the abnormality information of the object detection service 320 to the abnormality monitoring service 350.

In the step S412, the abnormality monitoring service 350 receives one of or both of a message indicating that the service is providable and a message expressing intention to utilize the service—these messages are being transmitted from the monitoring subject service to the other services. In the case where there exists a difference from the communication state in the database 400a at the upper stage of FIG. 16, it is determined that an abnormality has occurred in the monitoring subject service, and then the step S412 is followed by the step S413; in the case where there exists no difference, it is determined that no abnormality exists in the monitoring subject service, and then the step S411 is resumed; in the step S411, monitoring of the monitoring subject service is continued. The case where in the step S412, an abnormality is detected depending on the communication state is, for example, the following case: an unanticipated abnormality occurs in the object detection service 320; before notification of the abnormality from the object detection service 320 to the service execution management unit 521 has been completed, the object detection service 320 stops; as a result, the message indicating that the service is providable and the message expressing intention to utilize the service, which are periodically transmitted from the object detection service 320, are not transmitted any longer.

Next, in the step S413, the database 400a created in the step S406 represented in FIG. 15 is updated based on the abnormality information obtained in the step S411 or S412. For example, in the case where in the step S411, abnormality information is received, the item about whether or not an abnormality exists in the object detection service 320 is changed to "Yes". The database 400b at the middle stage of FIG. 16 is a database that has been updated in the step S413.

In the step S414, the abnormality monitoring service 350 issues to each of the abnormality information management services 3401 through 3403 a request for resource information items such as a CPU usage rate and a memory usage amount in each of the control apparatuses.

In the step S415, when receiving a request for information on the resource-usage state of the processing circuit in the control apparatus from the abnormality monitoring service 350, each of the abnormality information management services 3401 through 3403 obtains, from the OS, the CPU usage rate and the memory usage amount in the control apparatus through the service execution management unit of each of the control apparatuses, and then transmits the CPU usage rate and the memory usage amount to the abnormality monitoring service 350. For example, in the second control apparatus 120, the abnormality information management service 3402 obtains, from the OS, the present CPU usage rate and memory usage amount in the second control apparatus 120 through the service execution management unit 521, and then transmits the present CPU usage rate and memory usage amount to the abnormality monitoring service 350.

In the step S416, based on the CPU usage rate and memory usage amount in each of the control apparatuses transmitted from the abnormality information management services 3401 through 3403, the abnormality monitoring service 350 creates a list of the respective resource-usage states of the control apparatuses and stores the list in the main storage device 113a or the auxiliary storage device 113b in the first control apparatus 110. FIG. 18 represents an example of list 401 of the respective resource-usage states of the control apparatuses, to be created in the step S416. The respective IP addresses, CPU-usage rates, and memory usage amounts of the control apparatuses are stored in the list 401.

Next, recovery processing performed by the recovery service 360 will be explained by use of FIG. 19.

In the step S421, after the abnormality monitoring service 350 detects an abnormality related to the abnormality monitoring service and the collection of the respective resource-usage states (CPU usage rates and memory usage amounts) of the control apparatuses is completed in the step S416 represented in FIG. 17, the recovery service 360 makes a transition from a standby state to an execution state and then selects the relocation control apparatus in which the monitoring subject service where an abnormality has been detected is relocated.

For example, when an abnormality related to the object detection service 320 disposed in the second control apparatus 120 is detected, the recovery service 360 loads the execution manifest 321 for the object detection service 320 for recovery, stored in the monitoring subject service storage unit 516 (the auxiliary storage device 113*b* of the first control apparatus 110, in this example), into the main storage device 113*a*, and then reads the resource usage information (the maximum CPU usage rate and the maximum memory usage amount, in this example). Then the recovery service 360 compares the foregoing resource usage information with the list 401 in FIG. 18, which indicates the respective resource-usage states of the control apparatuses, and then selects the third control apparatus 130 that can contain the maximum CPU usage rate and the maximum memory usage amount of the object detection service 320. In this regard, however, it may be allowed that when there exist two or more control apparatuses that can contain the maximum CPU usage rate and the maximum memory usage amount, the recovery service 360 selects the control apparatus having a priority degree higher than that of any other control apparatus, based on the preliminarily set respective priority degrees of the control apparatuses. Alternatively, it may be allowed to preliminarily set the control apparatuses in which the respective monitoring subject services are relocated.

In contrast, in the case where there exists no control apparatus that can contain the resources for the monitoring subject service in which the abnormality has been detected, it may be allowed that the recovery service 360 ascertains the respective CPU usage rates and memory usage amounts of the services other than the monitoring subject services, such as the multimedia service that provides a less effect to the automatic driving control, and that in the case where the resources of the monitoring subject service in which the abnormality has been detected can be secured by stopping the foregoing services other than the monitoring subject services, the recovery service 360 performs processing of stopping the services other than the monitoring subject services, and then selects, as the relocation control apparatus, the control apparatus in which the foregoing resources have been secured. Moreover, in the case where in the control apparatus where the monitoring subject service in which the abnormality has been detected is disposed, the respective areas of the CPU and the memory can be divided into two or more areas, the monitoring subject services may be rearranged in the areas other than the area that is currently utilized by the monitoring subject service in which the abnormality has been detected. That is to say, it may be allowed that the monitoring subject services are rearranged in other areas selected in one and the same control apparatus.

In the step S422, the recovery service 360 rewrites the IP address of the recovery communication manifest for the monitoring subject service in which the abnormality has been detected with the IP address of the relocation control apparatus selected in the step S421. For example, the recovery service 360 rewrites the IP address of the recovery communication manifest 322 for the object detection service 320 in which an abnormality has occurred, from the IP address 192.168.1.2 of the second control apparatus 120 to the IP address 192.168.1.3 of the third control apparatus 130, which is the relocation control apparatus.

In the step S423, the recovery service 360 issues to the software update management unit 513 of the first control apparatus 110 a command to transfer a package including the recovery software element (program) and execution manifest for the object detection service 320 in which an abnormality has occurred and the communication manifest that has been rewritten in the step S422 to the service storage unit of the relocation control apparatus and then to make the foregoing storage unit store the package.

In the step S424, the relocation control apparatus receives the package, transferred in the step S423, including the software element and the like for the monitoring subject service in which an abnormality has been detected. The software update management unit of the relocation control apparatus stores the received package in the service storage unit (auxiliary storage device, in this example) of the relocation control apparatus. In this situation, in the case where the software element for the monitoring subject service, included in the received package, has been compressed, the software update management unit decompresses the software element and then stores the decompressed software element in the auxiliary storage device. In addition, it may be allowed that in order to confirm that the package has been normally received, the file size before the transfer and the file size after the transfer are compared with each other.

For example, the third control apparatus 130 that has been selected, as the relocation control apparatus, receives the package, transferred in the step S423, including the software element and the like for the monitoring subject service. After receiving the package, the software update management unit 533 of the third control apparatus decompresses the software for the object detection service 320, included in the package, and then stores the execution manifest 321 and the communication manifest 322 as well as the decompressed software in the auxiliary storage device 133*b*.

Next, in the step S425, the service execution management unit of the relocation control apparatus loads the execution manifest, included in the transferred package for the recovery monitoring subject service, from the auxiliary storage device into the main storage device, and then ascertains the starting conditions for the service; in the case where the starting conditions are satisfied, the service execution management unit starts the service. Then, as described above, when being a service provider, the started service issues a request for service-providable registration to the inter-service communication unit; when being a service user, the started service issues a request for utilization of the service to the inter-service communication unit.

For example, the service execution management unit 531 of the third control apparatus 130 loads the execution manifest 321 for the object detection service 320 from the auxiliary storage device 133*b* into the main storage device 113*a*; when the starting conditions are satisfied, the service execution management unit 531 starts the object detection service 320. The started object detection service 320 transmits to the inter-service communication unit 532 a request for service-providable registration for the object detection service 320 and a request for usage-searching of the vehicle control service 330; the inter-service communication unit 532 transmits a message indicating that the object detection service 320 is providable and waits to receive a message indicating that the vehicle control service 330 is providable. With regard to the operation after the recovery, it is only necessary that the third control apparatus 130 performs the processing represented in FIG. 13.

Next, the operation after the recovery processing will be explained by use of FIG. 20.

In the step S431, as is the case with the steps S404 through S406, the abnormality monitoring service 350 detects whether or not there exists an abnormality related to the monitoring subject service that has been relocated in the relocation control apparatus. For example, when the object detection service 320 relocated in the third control apparatus 130 operates correctly in the third control apparatus 130, the database 400b at the middle state, represented in FIG. 16, at a time when an abnormality has been detected is updated with the database 400c at the lower stage; the item about whether or not an abnormality exists in the object detection service 320 is changed to "no"; the IP address of the control apparatus where the object detection service 320 is disposed is changed to the IP address 192.168.1.3 of the third control apparatus.

In the step S432, based on the state of the monitoring subject service, obtained in the step S431, the abnormality monitoring service 350 determines whether or not the monitoring subject service that has been relocated in the relocation control apparatus is operating normally; in the case where the monitoring subject service is operating normally, the step S432 is followed by the step S433; in the case where it is not determined that the monitoring subject service is operating normally, the step S432 is implemented again after a predetermined time elapses. In addition, in the case where even when the step S432 is recurrently implemented a predetermined times, it is not determined that the monitoring subject service is operating normally, it may be allowed that the step S421 in FIG. 19 is resumed and the recovery processing is implemented again.

In the step S433, through the software update management unit 513 of the third control apparatus, the recovery service 360 transmits, to the control apparatus where the monitoring subject service in which the abnormality has been detected had been disposed before having been relocated, a request for deleting the software element and the execution and communication manifests for the monitoring subject service in which the abnormality has been detected. For example, the recovery service 360 issues to the software update management unit 513 a command to transmit a message for deleting the package including the software element, the execution manifest 321, and the communication manifest 322 to the second control apparatus 120.

Next, in the step S434, in the pre-relocation control apparatus that has received a request for deleting the package in the step S433, the software update management unit deletes the package—for which the deletion request has been received—from the auxiliary storage device. For example, when the object detection service 320 is operating, the software update management unit 523 of the second control apparatus 120 stops the object detection service 320 through the service execution management unit 521, and then deletes the package that includes the software element, the execution manifest 321, and the communication manifest 322 for the object detection service 320 and is stored in the auxiliary storage device 123b. In this regard, however, the timing at which the object detection service 320 is stopped may be the one at which an abnormality related to the object detection service 320 is detected.

Other Embodiments

Lastly, other embodiments of the present disclosure will be explained. The respective configurations of the embodiments explained below are not limited to the ones to be utilized alone; as long as no discrepancy occurs, each of those configurations can be utilized in combination with the configurations of the other embodiments.

(1) In foregoing Embodiment 1, as an example, there has been explained the case where the abnormality information management function of the service execution management unit in each of the control apparatuses and the abnormality monitoring unit and the recovery unit in the specific control apparatus are executed by the service execution management unit in each of the control apparatuses and operate as the abnormality information management service, the abnormality monitoring service, and the recovery service, each of which communicates with the other services through inter-service communication on the SOA. However, embodiments of the present disclosure are not limited thereto. That is to say, the abnormality information management function of the service execution management unit in each of the control apparatuses and the abnormality monitoring unit and the recovery unit in the specific control apparatus may operate as applications that operate on the OS.

(2) In foregoing Embodiment 1, as an example, there has been explained the case where the monitoring subject service storage unit that stores the software element and the execution and communication manifests for the recovery monitoring subject service is provided in the specific control apparatus. However, embodiments of the present disclosure are not limited thereto. That is to say, it may be allowed that the monitoring subject service storage unit is provided in the external apparatus 116, that the specific control apparatus has the external communication unit 517 communicating with the external apparatus, and that through the external communication unit, the recovery unit obtains from the external apparatus the software element and the execution and communication manifests for the monitoring subject service in which an abnormality has been detected, transfers the software element and the execution and communication manifests to the service storage unit in the relocation control apparatus, and makes the service storage unit store the software element and the execution and communication manifests. For example, the external apparatus 116 is a server connected with a network, and the external communication unit 517 is connected with the network and communicates with the server through the network.

Figure 21:
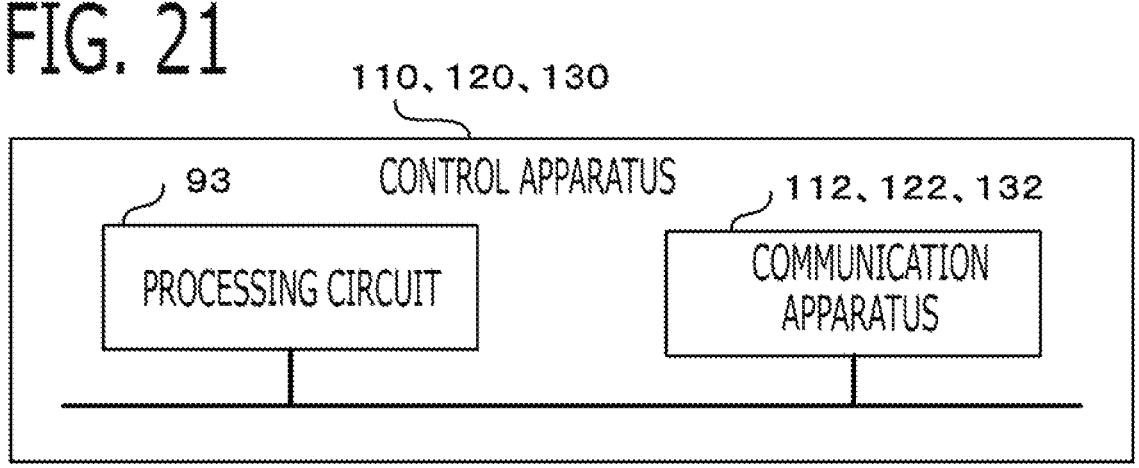
FIG. 21 is a hardware configuration diagram of a control apparatus according to another embodiment of the present disclosure.

(3) In foregoing Embodiment 1, as an example, there has been explained the case where each of the control apparatuses has, as the processing circuits, a computing processing unit such as a CPU and a storage device. However, embodiments of the present disclosure are not limited thereto. That is to say, as represented in FIG. 21, it may be allowed that as the processing circuit, there is provided dedicated hardware 93 such as a single circuit, a composite circuit, a programmed processor, a parallel-programmed processor, a neuro chip, an ASIC, an FPGA, or a circuit that is a combination thereof.

(4) In foregoing Embodiment 1, as an example, there has been explained the case in which the two or more services are performed by the two or more control apparatuses mounted in a vehicle, in which the network is an on-vehicle network, and in which the monitoring subject service is set to a service necessary for performing automatic driving of the vehicle. However, embodiments of the present disclosure are not limited thereto. That is to say, the control communication system may be an arbitrary control communication system other than a control communication system mounted in a vehicle. For example, the control communication system may be a control communication system that connects two or more control apparatuses provided in a plant such as a power station or a factory, through an intranetwork; alternatively, the control communication system may be a control communication system that connects two or more control apparatuses through a public network such as the Internet.

(5) In foregoing Embodiment 1, as an example, there has been explained the case in which as represented by the broken lines in FIG. 1, the vehicle information sensor group 150 is redundantly connected, through connection lines, not only with the second control apparatus 120 but also with the first control apparatus 110 and the third control apparatus 130, which may be relocated, and the steering control apparatus 160 and the power control apparatus 170 related to relocation are redundantly connected, through connection lines, not only with the third control apparatus 130 but also with the first control apparatus 110 and the second control apparatus 120, which may be relocated. However, embodiments of the present disclosure are not limited thereto. That is to say, each of the vehicle information sensor group 150, the steering control apparatus 160, and the power control apparatus 170 does not need to be redundantly connected with each of the control apparatuses, which may be relocated. In this case, for example, each of the vehicle information sensor group 150, the steering control apparatus 160, and the power control apparatus 170 may be connected, through an on-vehicle network, with each of the control apparatuses, which may be relocated.

In the present disclosure, illustrative embodiments are described; however, various features, modes, and functions disclosed in the embodiments are not limited to being applied to a specific embodiment but can be applied to embodiments separately or in various combinations. It is therefore understood that numerous modifications which have not been exemplified can be devised without departing from the scope of the technology disclosed in the specification of the present disclosure. For example, the case where at least one constituent element is modified, added, or omitted is included.

What is claimed is:

1. A control communication system comprising:
    two or more control apparatuses each of which can separately execute two or more software elements for each realizing a service, each service being a separate function; and
    a network for interconnecting the two or more control apparatuses,
    wherein for each service, there are provided an execution manifest including data on starting conditions for the service and a communication manifest including data on an identifier of the control apparatus in which the service is disposed and an identifier of the service,
    wherein each of the two or more control apparatuses comprises:
        a service storage device that stores a software element for the service disposed in the control apparatus and the execution manifest and the communication manifest for the service disposed in the control apparatus,
        a service execution manager that starts the service disposed in the control apparatus when the starting conditions included in the execution manifest for the service disposed in the control apparatus, stored in the service storage device, are satisfied,
        an inter-service communication device that can communicates with each service other than the service disposed in the control device by use of the communication manifest for the service disposed in the control device, stored in the service storage device, and
        a software update manager that applies updation, addition, and deletion to the software element and the execution manifest and the communication manifest for the service disposed in the control device, in the service storage device,
    wherein among each of specific control apparatuses that are preliminarily set, one or more of the two or more control apparatuses but less than a number of all of the two or more control apparatuses further comprises:
        an abnormality monitoring device that detects whether or not there exists an abnormality related to a preliminarily set monitoring subject service, and
        a recovery device that selects a relocation control apparatus that is another control apparatus among the two or more control apparatuses, to which the monitoring subject service in which the abnormality related to said monitoring subject service has been detected is relocated from the control apparatus where said monitoring subject service is currently disposed, in a case where the abnormality monitoring device detects the abnormality, and that transfers, through the software update manager, the software element and the execution manifest and the communication manifest for the monitoring subject service in which the abnormality has been detected to the service storage device of the relocation control apparatus and then makes said service storage device store said software element and said execution manifest and said communication manifest.

2. The control communication system according to claim 1,
    wherein the execution manifest for each service includes resource usage information on a processing circuit of the control apparatus that is utilized by that service,
    wherein when detecting the abnormality related to the monitoring subject service, the abnormality monitoring device issues to the service execution manager of each of the two or more control apparatuses a request for information on a resource-usage state of the processing circuit in each of the two or more control apparatuses, and then obtains the information on the resource-usage state transmitted from each of the two or more control apparatuses, and
    wherein, based on the information, about the resource-usage state of each of the two or more control apparatuses, that has been obtained by the abnormality monitoring device and on the resource usage information included in the execution manifest for the monitoring subject service in which the abnormality has been detected, the recovery device determines those control apparatuses, each of which contains resources to be utilized by the monitoring subject service in which the abnormality has been detected, and then selects one of the determined control apparatuses, as the relocation control apparatus.

3. The control communication system according to claim 2, wherein when determining that there exists no control apparatus that can contain the resources to be utilized by the monitoring subject service in which the abnormality has been detected, the recovery device stops execution of each service other than said monitoring subject service, secures a control apparatus that can then contain the resources to be utilized by said monitoring subject service in which the abnormality has been detected, and then selects said secured control apparatus, as the relocation control apparatus.

4. The control communication system according to claim 1,
wherein the service execution manager detects an abnormality in the service operating in the control apparatus, and
wherein the abnormality monitoring device detects, as the abnormality related to the monitoring subject service, whether or not there exists the abnormality related to the monitoring subject service that has been detected by the service execution manager in the control apparatus in which said monitoring subject service is disposed and an abnormality in inter-service communication between the monitoring subject service and any other service, performed by the inter-service communication device.

5. The control communication system according to claim 1,
wherein the inter-service communication device executes one of or both of a provision transmission for transmitting to each other service a message indicating that information on a product of the service is providable and a usage transmission for transmitting to each other service a message for utilization of information items on respective products of each other service, and
wherein in a case where execution of the provision transmission or the usage transmission between the monitoring subject service and each other service has been stopped, the abnormality monitoring device determines that the abnormality related to said monitoring subject service has occurred.

6. The control communication system according to claim 1,
wherein after rewriting the identifier of the control apparatus in the communication manifest for the monitoring subject service in which the abnormality has been detected with an identifier of the relocation control apparatus, the recovery device transfers, through the software update manager, the software element and the execution manifest and the communication manifest for said monitoring subject service in which the abnormality has been detected to the service storage device of the relocation control apparatus, and then makes said service storage device store said software element and said execution manifest and said communication manifest.

7. The control communication system according to claim 1, wherein when the starting conditions included in the execution manifest for the monitoring subject service stored in the service storage device are satisfied, the service execution manager of the relocation control apparatus starts said monitoring subject service.

8. The control communication system according to claim 1, wherein after the software element and the execution manifest and the communication manifest for the monitoring subject service in which the abnormality has been detected are transferred to the relocation control apparatus, the abnormality monitoring device issues a request for information on a resource-usage state of a processing circuit in the relocation control apparatus to said relocation control apparatus, obtains the information on the resource-usage state transmitted from said relocation control apparatus, and then determines, based on the information on the resource-usage state of said relocation control apparatus, whether or not the transferred monitoring subject service has normally started.

9. The control communication system according to claim 8, wherein in a case where it is determined that the monitoring subject service transferred by the abnormality monitoring device has normally started, the recovery device deletes, through the software update manager, the software element and the execution manifest and the communication manifest for the monitoring subject service from the service storage device of the control apparatus in which said monitoring subject service where the abnormality has been detected has been executed.

10. The control communication system according to claim 1,
wherein the specific control apparatus has a monitoring subject service storage device for storing, for recovery, the monitoring subject service and the execution manifest and the communication manifest for said monitoring subject service, and
wherein the recovery device transfers the software element and the execution manifest and the communication manifest for the monitoring subject service in which the abnormality has been detected from the monitoring subject service storage device to the service storage device of the relocation control apparatus and then makes said service storage device store said software element and said execution manifest and the communication manifest.

11. The control communication system according to claim 1,
wherein the specific control apparatus has an external communication device for performing communication with an external apparatus for storing, for recovery, the monitoring subject service and the execution manifest and the communication manifest for said monitoring subject service, and
wherein the recovery device obtains, through the external communication device, the software element and the execution manifest and the communication manifest for the monitoring subject service in which the abnormality has been detected from the external apparatus, transfers said software element and said execution manifest and said communication manifest to the service storage device of the relocation control apparatus, and then makes said service storage device store said software element and said execution manifest and said communication manifest.

12. The control communication system according to claim 1,
wherein each service is executed by one of the two or more control apparatus mounted in a vehicle,
wherein the network is an on-vehicle network, and
wherein the monitoring subject service is set as the service necessary for performing automatic driving of the vehicle.

* * * * *